United States Patent [19]
Akiyama et al.

[11] Patent Number: 5,737,413
[45] Date of Patent: *Apr. 7, 1998

[54] INFORMATION DISTRIBUTION SYSTEM WHEREIN STORAGE MEDIUM STORING CIPHERED INFORMATION IS DISTRIBUTED

[75] Inventors: Ryota Akiyama; Takayuki Hasebe; Makoto Yoshioka, all of Kawasaki, Japan

[73] Assignee: Fujitsu Limited, Kawasaki, Japan

[*] Notice: The term of this patent shall not extend beyond the expiration date of Pat. No. 5,440,631.

[21] Appl. No.: 415,611

[22] Filed: Apr. 3, 1995

Related U.S. Application Data

[62] Division of Ser. No. 51,749, Apr. 26, 1993, Pat. No. 5,440,631.

[30] Foreign Application Priority Data

Apr. 24, 1992  [JP]  Japan ................. 4-105033
Apr. 24, 1992  [JP]  Japan ................. 4-105034

[51] Int. Cl.$^6$ ................. H04L 9/32; G06F 3/06
[52] U.S. Cl. ................. 380/4; 380/5; 380/25
[58] Field of Search ................. 380/3-5, 25

[56] References Cited

U.S. PATENT DOCUMENTS

| | | | |
|---|---|---|---|
| 4,658,093 | 4/1987 | Hellman . | |
| 4,740,890 | 4/1988 | William . | |
| 4,879,645 | 11/1989 | Tamada et al. . | |
| 5,010,571 | 4/1991 | Katznelson | 380/4 |
| 5,014,234 | 5/1991 | Edwards, Jr. | 380/4 X |
| 5,103,392 | 4/1992 | Mori | 395/725 |
| 5,109,413 | 4/1992 | Comerford et al. | 380/4 |
| 5,214,697 | 5/1993 | Saito . | |
| 5,440,631 | 8/1995 | Akiyama et al. | 380/4 |

OTHER PUBLICATIONS

Mori et al; "Superdistribution: The Concept and the Architecture," The Transactions of the IEICE, vol. E 73, No. 7, Jul. 1990, pp. 1133–1146.

*Primary Examiner*—Gilberto Barrón, Jr.
*Attorney, Agent, or Firm*—Staas & Halsey

[57] ABSTRACT

A system for use when distributing information stored in a piece of storage medium from a supplier to users through a distributor(s). The information is ciphered when stored in each piece of storage medium in a supplier apparatus. In addition, ciphered key information may be stored in the piece of storage medium together with the above information to be distributed. A distributor apparatus may convert the cipher of the key information before distributing the piece of storage medium to the users. The distributor apparatus may write further information in the piece of storage medium before distributing the piece of storage medium to the users. The further information indicates a limit of an operation of reading the information by each user, and may be a maximum allowable accumulated time of reading the information by each user, a maximum number of repetitions of the reading operation of the information by each user, or a time limit of the operation of the reading operation by each user. Each user apparatus stops the reading operation when the reading operation has reached the limit. Further, each user apparatus may write information indicating an amount of the reading operation therein, in the piece of storage medium, and the distributor apparatus may compare a sum of amounts of the above limits for pieces of storage medium distributed therefrom, with a sum of the amounts of the reading operations in the respective pieces of storage medium after the pieces of storage medium are returned to the distributor apparatus.

28 Claims, 14 Drawing Sheets

5,737,413

INFORMATION DISTRIBUTION SYSTEM WHEREIN STORAGE MEDIUM STORING CIPHERED INFORMATION IS DISTRIBUTED

This application is a division of application Ser. No. 08/051,749, filed Apr. 26, 1993, now U.S. Pat. No. 5,440,631.

BACKGROUND OF THE INVENTION (1) Field of the Invention

The present invention is relates to an information distribution system for distributing pieces of storage medium each storing information. The information stored in the storage medium may be a computer program, digitized sound and/or video information, digitized magazine or book information, or the like.

(2) Description of the Related Art

Digital information such as music, a movie, a computer program, a digitized magazine, a book, a dictionary, and the like each stored in a piece of storage medium such as a floppy disk, a CD-ROM (compact disk), or a laser disk, are distributed from suppliers thereof to users through distributors such as record shops, video shops, bookstores, computer software shops, and the like. In addition, the CD-ROMs (compact discs) and the laser discs storing movies and music may be sold to users, or may be rented to users at rental shops.

In the above distribution system of digital information, there is a possibility that the digital information stored in the storage medium may be illegally used. For example, the information in the storage medium may be illegally copied and diverted to a black market channel. Further, such an illegal copy may be made in a distribution route between the suppliers and the distributors.

In addition, the pieces of storage medium displayed in the shops for sale or rental, may be shoplifted.

When such illegal use or shoplifting occurs, the suppliers and the distributors suffer great damage. Therefore, techniques for preventing the illegal use or shoplifting of the information stored in a piece of storage medium, are required.

SUMMARY OF THE INVENTION

A first object of the present invention is to provide an information distribution system wherein illegal use and shoplifting are prevented by reducing an undue profit which a person who illegally uses information stored in a piece of storage medium may obtain.

A second object of the present invention is to provide an information distribution system wherein illegal use and shoplifting are detected.

A third object of the present invention is to provide an information distribution system wherein illegal use in a distribution route between a supplier of the storage medium and the distributor is prevented.

According to the first aspect of the present invention, there is provided an information distribution system containing: at least one supplier apparatus, at least one distributor apparatus, and at least one user apparatus. Each of the at least one supplier apparatus contains: a first storage medium holding unit for temporarily holding a piece of storage medium which contains first and second areas for storing first and second ciphered information, respectively, and the second ciphered information indicates a limit of an operation of reading the first ciphered information by each of at least one user apparatus; a first key storing unit for storing first key information; a first ciphering unit for ciphering information to be distributed, by using the first key information to generate the first ciphered information; and a first writing unit for writing the first ciphered information in the first area of the piece of storage medium held in the first storage medium holding unit, in such a manner that the first ciphered information in the first area cannot be rewritten after the writing by the first writing unit. Each of the above at least one distributor apparatus contains: a second storage medium holding unit for temporarily holding the piece of storage medium; a limit information generating unit for generating first limit information indicating a limit of the operation of reading the first ciphered information; a second key storing unit for storing the second key information; a second ciphering unit for ciphering the first limit information, by using the second key information stored in the second key storing unit, to generate the second ciphered information; and a second writing unit for writing the second ciphered information in the second area of the piece of storage medium held in the second storage medium holding unit. Each of the above at least one user apparatus contains: a third storage medium holding unit for temporarily holding the piece of storage medium; a first reading unit for reading the first ciphered information written in the first area of the piece of storage medium held in the third storage medium holding unit; a third key storing unit for storing the first key information; a fourth key storing unit for storing the second key information; a first deciphering unit for deciphering the first ciphered information read by the first reading unit, to obtain the first information to be distributed, by using the first key information stored in the third key storing unit; a second reading unit for reading the second ciphered information written in the second area of the piece of storage medium held in the third storage medium holding unit; a second deciphering unit for deciphering the second ciphered information read by the second reading unit, by using the second key information stored in the fourth key storing unit, to obtain the first limit information; an amount-of-use obtaining unit for obtaining an amount of the operation of reading the first ciphered information in the user apparatus; an over-limit determining unit for determining whether or not the amount of the operation obtained by the amount-of-use obtaining unit has reached the limit indicated by the first limit information obtained by the second deciphering unit; and a stop unit for stopping the operation of reading the first ciphered information when the over-limit determining unit determines that the amount of the operation obtained by the amount-of-use obtaining unit has reached the limit.

According to the second aspect of the present invention, in addition to the construction of the first aspect of the present invention, each of the at least one user apparatus further contains a limit information renewing unit for renewing the second ciphered information in the second area of the piece of storage medium. The limit information renewing unit contains: a remaining amount determining unit for determining as a remaining amount a difference between the limit of the operation of reading the first ciphered information indicated by the first limit information obtained by the second deciphering unit and the amount of the operation obtained by the amount-of-use obtaining unit; a third ciphering unit for ciphering information on the remaining amount, by using the second key information stored in the fourth key storing unit, to generate a renewal data of the second ciphered information; and a third writing unit for writing the renewal data of the second ciphered information in the second area of the piece of storage medium held in the third storage medium holding unit.

According to the third aspect of the present invention, in addition to the construction of the second aspect of the present invention, the piece of storage medium further contains a third area for storing identification information identifying the information to be distributed. The supplier apparatus further contains: an identification information writing unit for writing the identification information in the third area of the piece of storage medium. Each of the at least one distributor apparatus further contains: an allowed amount storing unit for storing one or more values of the limit of the operation of reading the first ciphered information which values have been written in one or more pieces of storage medium which have been distributed; a total allowed amount control unit for obtaining and storing for each piece of identification information a first sum of one or more values of the limit of the operation of reading the first ciphered information which values have been written in one or more pieces of storage medium which have been distributed for the identification information; a third reading unit for reading the renewal data of the second ciphered information written in the second area of the piece of storage medium held in the third storage medium holding unit; a third deciphering unit for deciphering the second ciphered information read by the third reading unit, by using the second key information stored in the fourth key storing unit, to obtain the information on the remaining time; a used amount obtaining unit for obtaining an amount of use in the user apparatus based on a difference between the remaining amount obtained by the third deciphering unit and one of the values of the limit of the operation of reading the first ciphered information stored in the allowed amount storing unit for the piece of storage medium held in the third storage medium holding unit; a total used amount control unit for obtaining a second sum of the used amount obtained by the used amount obtaining unit; and an amount comparing unit for comparing the first and second sums to detect illegal use of the first information stored in the piece of storage medium.

According to the fourth aspect of the present invention, in addition to the construction of the first aspect of the present invention, the piece of storage medium further contains a third area for storing identification information identifying the information to be distributed. The distributor apparatus further contains: an identification information writing unit for writing the identification information in the third area of the piece of storage medium; a third reading unit for reading the renewal data of the second ciphered information written in the second area of the piece of storage medium held in the third storage medium holding unit; a third deciphering unit for deciphering the second ciphered information read by the third reading unit, by using the second key information stored in the fourth key storing unit, to obtain the information on the remaining amount; and a used amount obtaining unit for obtaining an amount of use in the user apparatus based on a difference between the remaining amount obtained by the third deciphering unit and one of the values of the limit of the operation of reading the first ciphered information stored in the allowed amount storing unit for the piece of storage medium held in the second storage medium holding unit. The information distribution system further contains a control center apparatus, and the control center apparatus contains: an allowed amount storing unit for storing one or more values of the limit of the operation of reading the first ciphered information which values have been written in one or more pieces of storage medium which have been distributed from the at least one distributor apparatus; a total allowed amount control unit for obtaining and storing for each piece of identification information a first sum of one or more values of the limit of the operation of reading the first ciphered information which values have been written in one or more pieces of storage medium which have been distributed for the identification information from the at least one distributor apparatus; a total used amount control unit for obtaining a second sum of the used amount obtained by the used amount obtaining unit; and an amount comparing unit for comparing the first and second sums to detect illegal use of the first information stored in the piece of storage medium.

According to the fifth aspect of the present invention, in addition to the construction of the first aspect of the present invention, each of the at least one distributor apparatus further contains: an input unit for receiving second limit information indicating the limit of the operation of reading the first ciphered information; and the limit information generating unit generates the first limit information in accordance with the second limit information.

According to the sixth aspect of the present invention, there is provided an information distribution system containing: at least one supplier apparatus, at least one distributor apparatus, and at least one user apparatus. Each of the at least one supplier apparatus contains: a first storage medium holding unit for temporarily holding a piece of storage medium which contains first and second areas, and first and second ciphered information is stored in the first and second areas, respectively; a first key storing unit for storing first key information; a second key storing unit for storing second key information; a first ciphering unit for ciphering first information by using the first key information to generate first ciphered information; and a first writing unit for writing the first ciphered information in the first area of the piece of storage medium held in the first storage medium holding unit, in such a manner that the first ciphered information in the first area cannot be rewritten after the writing by the first writing unit; a second ciphering unit for ciphering the first key information by using the second key information to generate second ciphered information; and a second writing unit for writing the second ciphered information in the second area of the piece of storage medium held in the first storage medium holding unit. Each of the at least one distributor apparatus contains: a second storage medium holding unit for temporarily holding the piece of storage medium; a third key storing unit for storing the second key information; a fourth key storing unit for storing third key information; a first reading unit for reading the second information written in the second area of the piece of storage medium held in the second storage medium holding unit; a first deciphering unit for deciphering the second ciphered information read by the first reading unit, to obtain the first key information by using the second key information stored in the third key storing unit; a third ciphering unit for ciphering the first key information obtained by the first deciphering unit, by using the third key information stored in the fourth key storing unit, to generate the third ciphered information; and a third writing unit for writing the third ciphered information in the second area of the piece of storage medium held in the second storage medium holding unit. Each of the at least one user apparatus contains: a third storage medium holding unit for temporarily holding the piece of storage medium; a second reading unit for reading the first and third ciphered information respectively written in the first and second areas of the piece of storage medium held in the third storage medium holding unit; a fifth key storing unit for storing the third key information; a second deciphering unit for deciphering the third ciphered information read by the second reading unit, by using the third key information stored in the fifth key storing unit, to obtain the first key information; and a third deciphering unit for deciphering the first ciphered information read by the second reading unit, by using the first key information obtained by the second deciphering unit, to obtain the first information.

Further, in the above constructions of the first to sixth aspects of the present invention, the provisions in each of the at least one distributor apparatus may be included in each of the at least one supplier apparatus.

DESCRIPTION OF THE PREFERRED EMBODIMENTS

Figure 1:
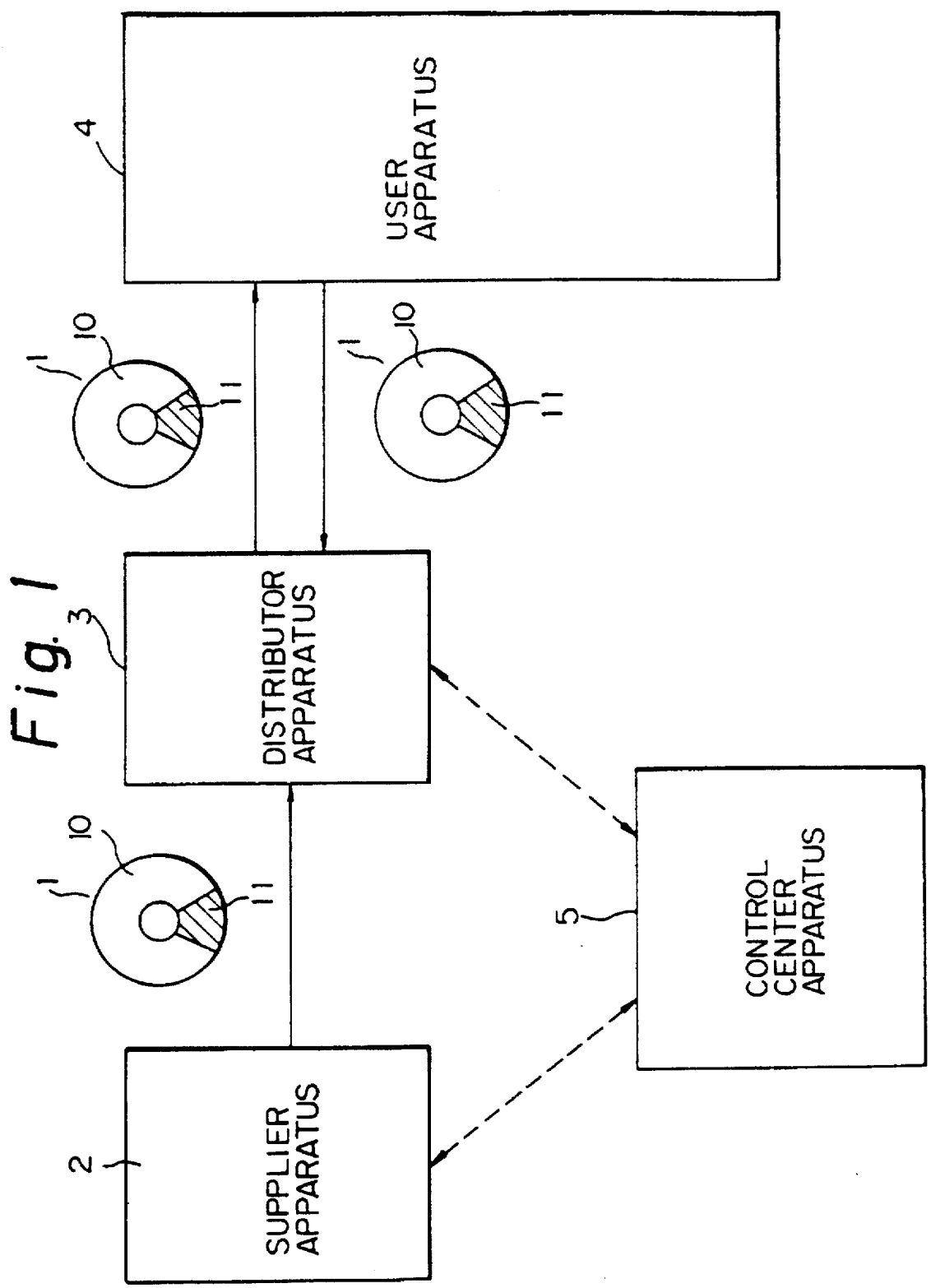
FIG. 1 is a diagram illustrating an outline of the whole information distribution system according to the present invention.

Outline of Information Distribution System (FIG. 1)

FIG. 1 is a diagram illustrating an outline of the whole information distribution system according to the present invention. In FIG. 1, reference numeral 1 denotes a piece of storage medium, 2 denotes a supplier apparatus, 3 denotes a distributor apparatus, 4 denotes a user apparatus, 5 denotes a control center apparatus, 10 denotes an unrewritable area (hereinafter called a ROM area), and 11 denotes a rewritable area (hereinafter called a RAM area).

In the first and second embodiments of the present invention, information to be distributed, for example, music, a computer program, or the like, is written in the unrewritable area of each piece of storage medium 1 after being ciphered, and key information used for ciphering the information to be distributed, is written in the rewritable area of each piece of storage medium 1 after being ciphered. The unrewritable area may be realized with an optical storage medium such as that used for compact discs, and the rewritable area may be realized by an magnetic or magneto-optic storage medium such as that used for magneto-optical discs. Otherwise, the unrewritable area and the rewritable area are provided within an IC card which contains a random access memory (RAM) and a read-only memory (ROM).

The supplier apparatus 2 in FIG. 1 may be located at an information supplier (hereinafter called software), such as a record company which produces and supplies compact discs (CD) after music information is stamped thereon, a magazine publisher company which produces and supplies compact discs (CD) after magazine information is stamped thereon, or a computer software company which produces and supplies CD-ROM's, magnetic discs, or IC memory cards after a computer program is written therein. The distributor apparatus 3 may be located at each distributor's location, such as a record shop, a bookstore, a computer software shop, or the like. The user apparatus 4 is located at each user's location. These shops and stores may sell each piece of storage medium to users, or the users may rent a piece of storage medium from the shops and stores. Since, in the first and second embodiments, an amount of use of (reading the information stored in) each piece of storage medium by each user is limited to a limit given by the distributor apparatus, as explained later, the users must bring their piece of storage medium back to the distributor's location when the users has used the piece of storage medium to the limit. The control center apparatus 5 may be located at a control center or in a supplier's location, and contains supplier's (or manufacturer's) information for each software item. The control center apparatus 5 may be connected with each of the supplier apparatus 2 and the distributor apparatus(es) through a communication channel.

Figure 2:
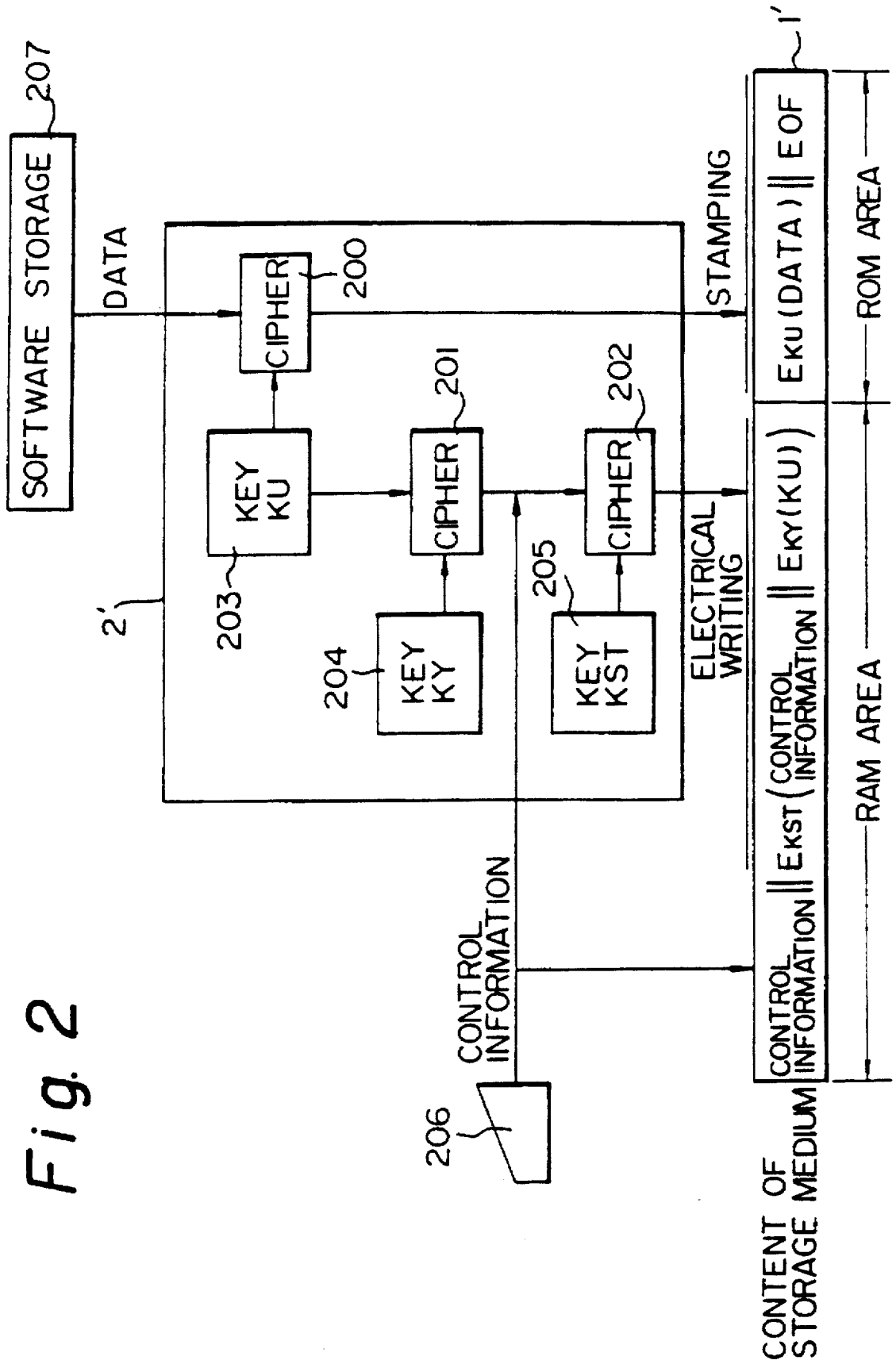
FIG. 2 is a diagram illustrating an example of construction of a supplier apparatus in the first embodiment of the present invention.

Supplier Apparatus in First Embodiment of Present Invention (FIG. 2)

FIG. 2 is a diagram illustrating an example of construction of a supplier apparatus in the first embodiment of the present invention. In FIG. 2, reference numeral 1' denotes the content of a piece of storage medium, 2' denotes a supplier apparatus, 200, 201 and 202 each denote a cipher circuit, 203, 204 and 205 each denote a key register, 206 denotes an operator's console, and 207 denotes a software storage.

Information to be distributed, and which is in the form of digital data and is not ciphered yet, is first stored in the software storage 207. When a predetermined command for instructing a start of data writing operation is input through the operator's console 206 into a controller (not shown) which controls the construction of the user apparatus of FIG. 2, the information is supplied to the cipher circuit 200. The cipher circuit 200 ciphers the digital data of the information by using key information KU which is stored in the key register 203, and is supplied to the cipher circuit 200, and ciphered information EKU(DATA) is generated. The ciphered information EKU(DATA) is stamped (written in an unrewritable manner) on the ROM area (unrewritable area) of the piece 1' of storage medium, by a conventional data stamping mechanism (not shown) provided in the supplier apparatus, where such a mechanism contains a mechanism for holding a piece of storage medium (not shown) such as that provided in the conventional magneto-optical disc drive device.

In addition, the key information KU is also supplied to the cipher circuit 201 as digital data to be ciphered, and the cipher circuit 201 ciphers the key information KU by using key information KY which is stored in the key register 204, and is supplied to the cipher circuit 201 as key information for the ciphering therein. Thus, ciphered key information $E_{KY}(KU)$ is generated by the cipher circuit 201. Parallel to the ciphering operation of the key information KY, control information is input through the operator's console 208. The control information may contain an identification number or title of the information which identifies pieces of storage medium which store the same information to be distributed, another identification number which identifies each piece of storage medium, and information indicating whether each piece of storage medium is for sale or for rental. The control information may contain further information generated in the supplier apparatus. The control information and the above ciphered key information $E_{KY}(KU)$ are supplied to the cipher circuit 202 as data to be ciphered. The cipher circuit 202 ciphers the control information and the above ciphered key information $E_{KY}(KU)$ by using key information KST which is stored in the key register 205, and is supplied to the cipher circuit 202 as key information for the ciphering. Thus, ciphered information $E_{KST}$(control information/$E_{KY}(KU)$) containing the ciphered control information and twice ciphered key information KY, is generated by the cipher circuit 202. The ciphered information $E_{KST}$(control information/$E_{KY}(KU)$) obtained by the cipher circuit 202 is electrically (in a rewritable manner) written in the rewritable area of the piece 1' of storage medium by a conventional data writing mechanism (not shown). Further, the above control information is also written in the rewritable area of the piece 1' of storage medium without being ciphered.

Figure 3:
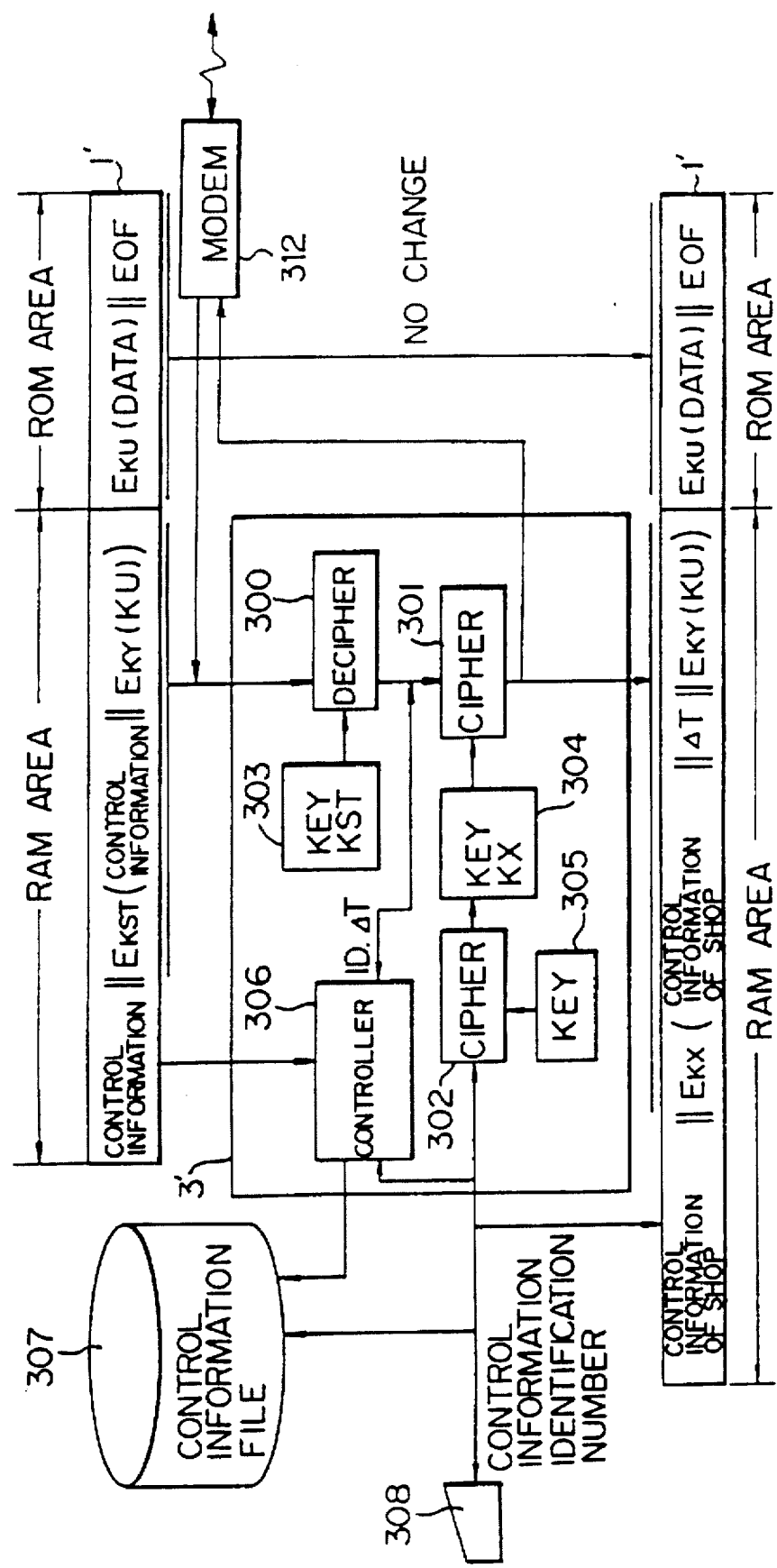
FIG. 3 is a diagram illustrating a first example of construction of a distributor apparatus in the first embodiment of the present invention.

First Distributor Apparatus in First Embodiment of Present Invention (FIG. 3)

FIG. 3 is a diagram illustrating a first example of construction of a distributor apparatus in the first embodiment of the present invention. In FIG. 3, reference numeral 1' denotes a content of a piece of storage medium, 3' denotes a distributor apparatus, 300 denotes a decipher circuit, 301 denotes a cipher circuit, 301 and 302 each denote a key register, 303, 304 and 305 each denote a key register, 306 denotes a controller, 307 denotes a control information file, 308 denotes an operator's console, and 312 denotes a modem. The modem 312 is provided for communicating with the user apparatuses 3' as explained later.

In the construction of FIG. 3, according to the fifth aspect of the present invention, the ciphered information $E_{KST}$ (control information/$E_{KY}(KU)$) which has been written in the rewritable area of the piece 1' of storage medium, is once deciphered, and is then ciphered, together with other control information generated in the distributor, by using another key information, as explained below.

When, in response to a request by a user to buy or rent a piece 1' of storage medium, the piece 1' of storage medium is newly received and held in a conventional storage medium reading/writing mechanism (not shown) which is provided in the distributor apparatus and contains a conventional storage medium holding mechanism such as that provided in the conventional magneto-optical disc drive device, and a predetermined command is input to the controller 306 through the operator's console 308, the ciphered information $E_{KST}$(control information/$E_{KY}(KU)$) written in the rewritable area of the piece 1' of storage medium is read by the storage medium reading/writing mechanism, and is then supplied to the decipher circuit 300. The decipher circuit 300 deciphers the ciphered information $E_{KST}$(control information/$E_{KY}(KU)$) by using the key information KST which is the same key information as stored in the key register 205 in FIG. 2, is also stored in the key register 303, and is supplied to the decipher circuit 300. Thus, the control information generated in the supplier apparatus 2' of FIG. 2, and the ciphered key information $E_{KY}(KU)$ are regenerated by the decipher circuit 300. The control information is transferred by the controller 306 to the control information file 307 to be stored therein, and is supplied to the cipher circuit 301.

In addition, other control information including time limit information ΔT, code indicating the distributor, code indicating the user, an identification number IDi (i=1, 2, ...) of the piece 1' of storage medium given by the distributor, and the like, is input through the operator's console 308 to the controller 306. The limit information ΔT may indicate: a maximum allowable accumulated time for an operation of reading the information written in the unrewritable area in the piece of storage medium by the user apparatus 4' (FIG. 5); a limit duration to be counted from a time the piece 1' of storage medium is first read by the user apparatus regardless of interruptions in the reading operation; or a terminating date and time of allowance of reading the ciphered information written in the unrewritable area of the piece 1' of storage medium. The above other control information input in the distributor apparatus is transferred by the controller 306 to the control information file 307 to be stored therein together with the above control information regenerated by the decipher circuit 300. The above other control information input in the distributor apparatus, is transferred through the controller 306 to the cipher circuit 301, to be ciphered together with the above output of the decipher circuit 300.

Then, the cipher circuit 301 ciphers the above the control information generated in the supplier apparatus 2' of FIG. 2, and the ciphered key information $E_{KY}(KU)$ together with the control information additionally input into the distributor apparatus 3', by using key information KX which is held in the key register 304 to be supplied to the cipher circuit 301. The key information KX is generated by the cipher circuit 302 by ciphering the identification number IDi (i=1, 2, ...) of the piece 1' of storage medium given by the distributor, by using key information which is held in the key register 305, and is supplied to the cipher circuit 302. The identification number IDi (i=1, 2, ...) of the piece 1' of storage medium given by the distributor, is directly supplied to the cipher circuit 302 from the operator's console 308. Then, the ciphered information $E_{KX}$(CONTROL INFORMATION/ΔT/$E_{KY}(KU)$) generated by the cipher circuit 301 is electrically (in a rewritable manner) written in the rewritable area of the piece 1' of storage medium.

In addition, the above control information input from the operator's console 308 is also written in another portion of the rewritable area of the piece 1' of storage medium without being ciphered.

Since the ciphering of the key information KU which is used for generating ciphered information written in the unrewritable area of the piece of storage medium, is changed from the ciphering using the key information KST to the ciphering using the key information KX, possible illegal use of the information to be distributed, in a distribution route between the supplier to the distributor, can be prevented.

Figure 4:
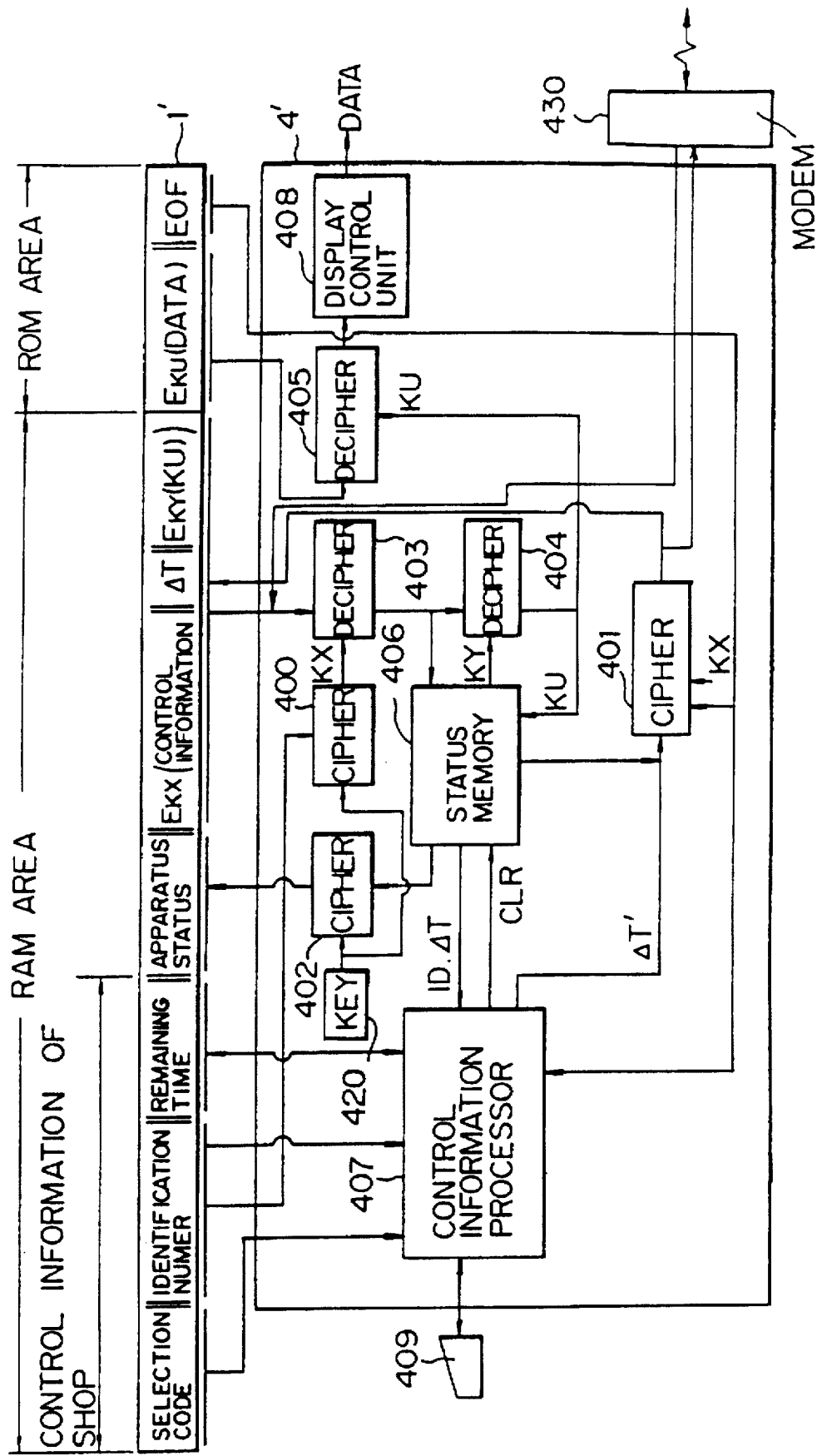
FIG. 4 is a diagram illustrating an example of construction of a user apparatus in the first embodiment of the present invention.

User Apparatus in First Embodiment of Present Invention (FIG. 4)

FIG. 4 is a diagram illustrating an example of construction of a user apparatus in the first embodiment of the present invention. In FIG. 4, reference numeral 1' denotes a content of a piece of storage medium, 4' denotes a user apparatus, 400, 401 and 402 each denote a cipher circuit, 403, 404 and 405 each denote a decipher circuit, 406 denotes a status memory, 407 denotes a control information processor unit, 408 denotes a display control unit, 409 denotes an operator's console, 420 denotes a key register, and 430 denotes a modem.

When a piece 1' of storage medium which a user rents from the distributor, is inserted and set in a storage medium holding mechanism (not shown) provided in the supplier apparatus such as that provided in the conventional magneto-optical disc drive device, and a predetermined command "START READ" for instructing a start of a data reading operation is input through the operator's console 409 to the control information processor 407, the identification number IDi (i=1, 2, . . .) written in the rewritable area of the piece 1' of storage medium is read and supplied to the cipher circuit 400. The cipher circuit 400 operates in the same manner as the cipher circuit 302 in the construction of FIG. 3, i.e., the cipher circuit 400 ciphers the identification number IDi (i=1, 2, . . .) by using key information stored in the key register 420, and is supplied to the cipher circuit 400, where the key information stored in the key register 420 is the same key information as stored in the key register 305 in the construction of FIG. 3. Thus, the cipher circuit 400 generates the key information KX, and supplies the same to the decipher circuit. The ciphered information EKX (CONTROL INFORMATION/$\Delta$T/EKY(KU)) which is written in the rewritable area of the piece 1' of storage medium is read and supplied to the decipher circuit 403. The decipher circuit 403 deciphers the ciphered information EKX (CONTROL INFORMATION/$\Delta$T/EKY(KU)) to regenerate the above-mentioned control information generated in the distributor apparatus 3', the time limit information $\Delta$T, and the ciphered key information EKY(KU). The control information generated in the distributor apparatus 3', and the time limit information $\Delta$T are written in the status memory 406, and the ciphered key information EKY(KU) is supplied to the decipher circuit 404. The decipher circuit 404 deciphers the ciphered key information EKY(KU) by using the key information KY stored in the status memory 406, to regenerate the key information KU. The regenerated key information KY is written in the status memory 406. The value of the key information KY is supplied to the decipher circuit 405 to decipher the ciphered information EKU(DATA) which is read from the unrewritable area of the piece 1' of storage medium, to regenerate the information to be distributed. The regenerated information is supplied to the display control circuit 408 to display the regenerated information.

During the operation of reading and deciphering the ciphered information EKY(KU), the control information processor counts an accumulated time of the operation of reading the ciphered information EKY(KU), a time counted from a time the piece 1' of storage medium is first read by the user apparatus regardless of interuptions in the reading operation, or a current time, as explained later. When the counted time has reached the above time limit $\Delta$T, the control information processor 407 clears the value of the key information KY written in the status memory 406, and corresponding to the clearing of the value of the key information KY, the decipher circuit 405 stops the deciphering operation.

When the operation of reading the information is completed, a code EOF indicating an end of the file, which is written following the information in the unrewritable area of the piece 1' of storage medium, is read and detected by the control information processor 407, the control information processor 407 calculates a remaining time $\Delta$T' as a difference between the time limit value which is read from the rewritable area of the piece 1' of storage medium when the reading operation of the ciphered information begins, and the value of the above counted time when the EOF code is detected, in the system where the time limit indicates the maximum allowable accumulated time for an operation of reading the information, or the limit duration to be counted from a time the piece 1' of storage medium is first read by the user apparatus regardless of interuptions in the reading operation.

Then, the control information processor 407 supplies the control information written in the status memory 406 as above, to the cipher circuit 401. The cipher circuit 401 receives the control information from the status memory 406 and the above remaining time $\Delta$T', and ciphers both pieces of the information by using the key information KX which is generated by the cipher circuit 400 to generate renewal data of the ciphered information EKX(CONTROL INFORMATION/$\Delta$T/EKY(KU)). The renewal data of the ciphered information EKX(CONTROL INFORMATION/ $\Delta$T/EKY(KU)) is written in the rewritable area of the piece 1' of storage medium. In addition, information indicating status of the user apparatus 4' which is held in the status memory is ciphered by the cipher circuit 402 by using the key information supplied from the key register 420, and the ciphered information on the status is written for maintenance in the rewritable area of the piece 1' of storage medium.

Further, the above operations for ciphering and writing the renewal data of the information in the piece of storage medium is also performed when the reading operation is stopped when the count has reached the time limit, or when the reading operation is stopped by receiving a command to stop the operation from the operator's console 409.

Figure 5:
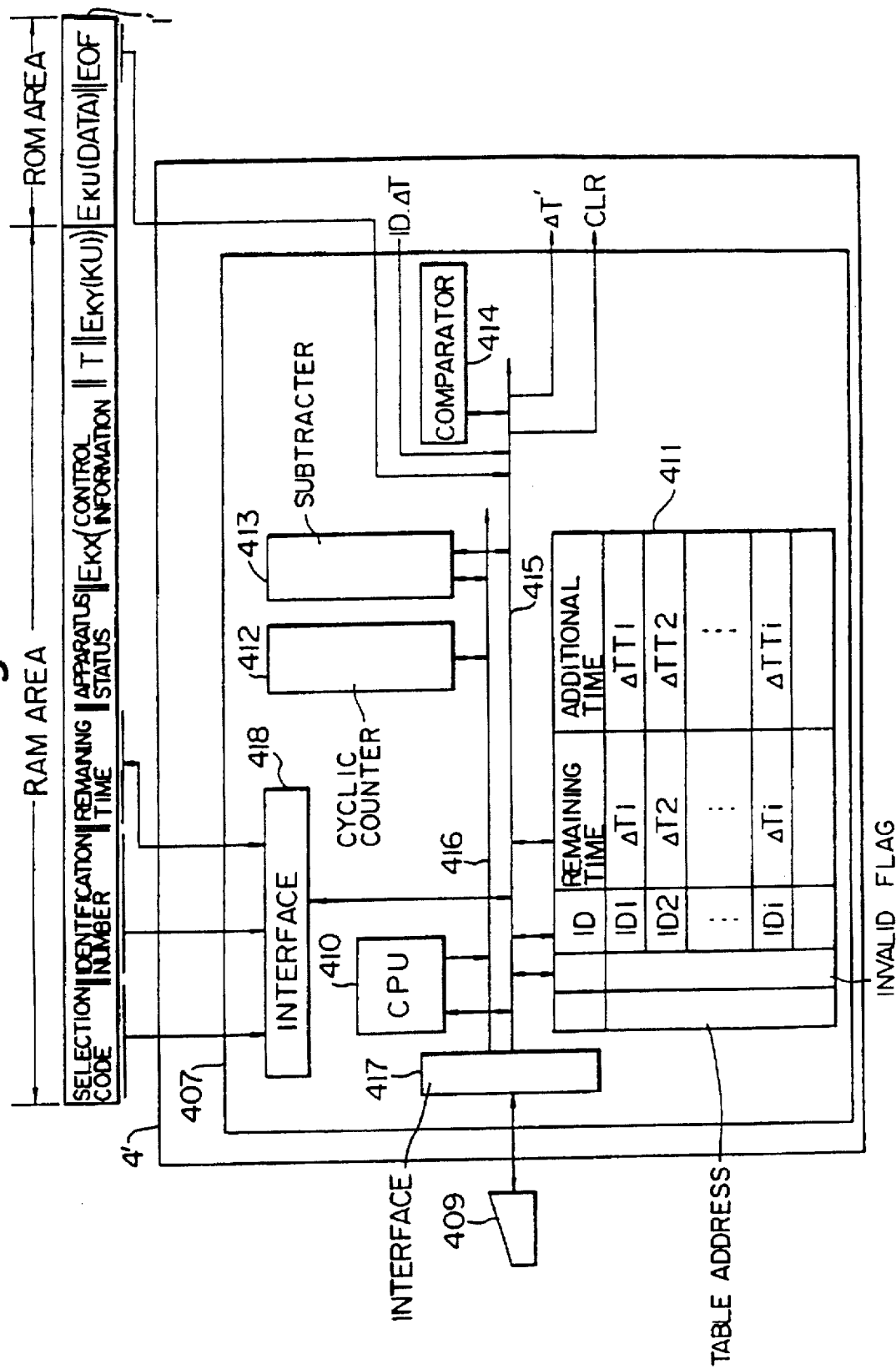
FIG. 5 is a diagram illustrating an example of a detailed construction of the control information processor unit 407 in the user apparatus 4' of FIG. 4.
Figure 6:
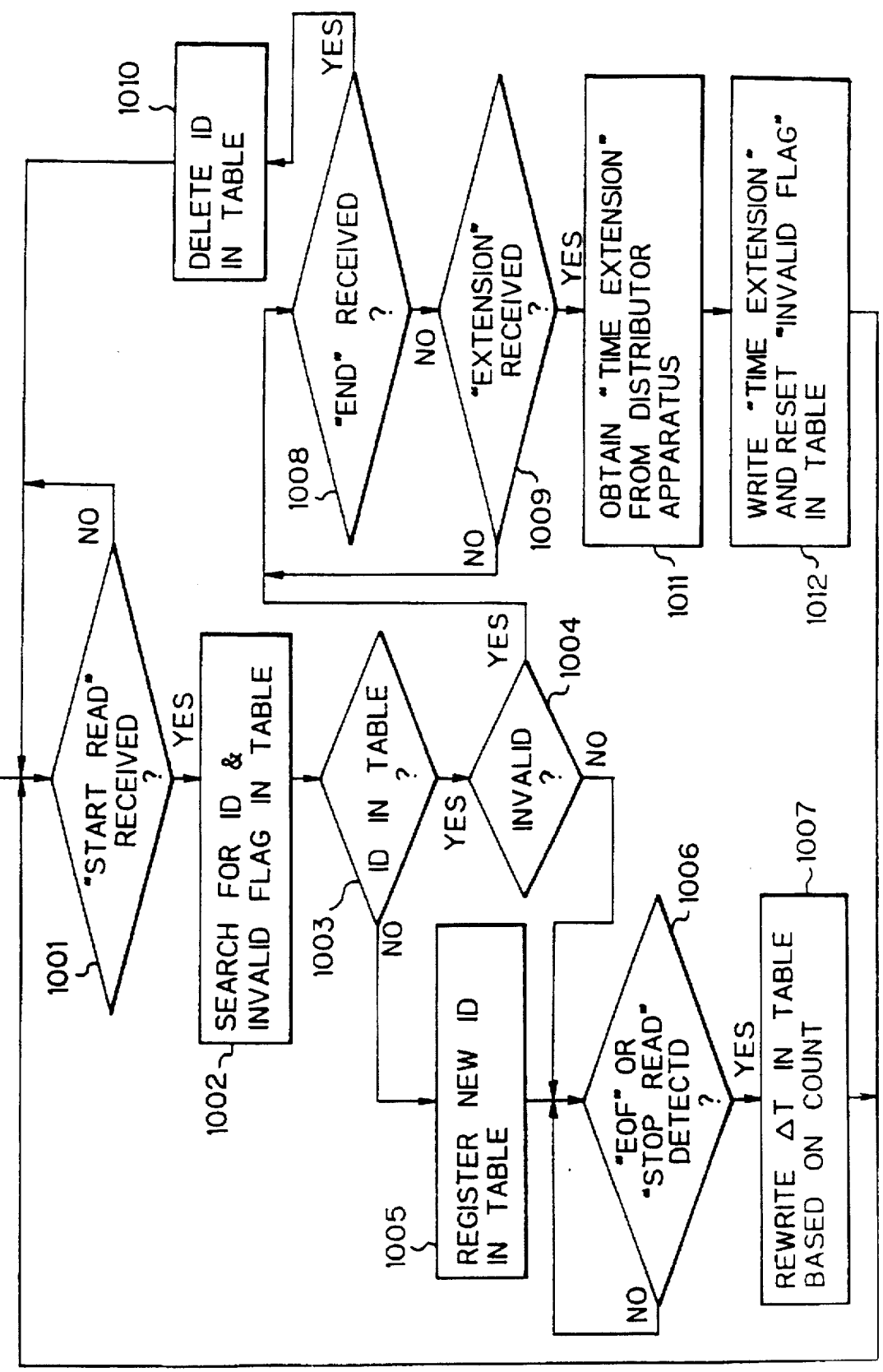
FIG. 6 is a flowchart of the operation of registering the identification table 411.

Control Information Processor Unit in FIG. 4 (FIGS. 5 and 6)

FIG. 5 is a diagram illustrating an example of a detailed construction of the control information processor unit 407 in the user apparatus 4' of FIG. 4. In FIG. 5, reference numeral 407 denotes the control information processor unit in the construction of FIG. 4. In the control information processor unit 407, reference numeral 410 denotes a central processing unit (CPU), 411 denotes an identification table, 412 denotes a cyclic counter, 413 denotes a subtracter, user apparatus, 414 denotes a comparator, 415 and 416 each denote a bus, and 417 and 418 each denote an interface circuit.

In the construction of FIG. 5, the cyclic counter 412 is provided for counting the above accumulated time of the operation of reading the ciphered information EKY(KU), the time counted from a time the piece 1' of storage medium is first read by the user apparatus regardless of interuptions in the reading operation, or a current time, as mentioned above. The cyclic counter 412 is backed up by a battery so that the cyclic counter 412 can operates when the user apparatus is powered off.

When the above-mentioned command is input from the operator's console 409 through the interface circuit 417 to the central processing unit (CPU) 410, the central processing unit 410 writes the identification number IDi (i=1, 2, . . .) of the piece 1' of storage medium, and the time limit $\Delta$T or the remaining time $\Delta$T' which are read from the rewritable area of the piece 1' of storage medium, are written in the identification table 411. In the system where the time limit indicates the terminating date and time of allowance of reading the ciphered information written in the unrewritable area of the piece 1' of storage medium, the remaining time $\Delta$T' does not need to be written in the identification table 411.

In the system where the time limit indicates the maximum allowable accumulated time for an operation of reading the information, or the limit duration to be counted from a time the piece 1' of storage medium is first read by the user apparatus regardless of interuptions in the reading operation, the value of the time limit ΔT or the remaining time ΔT', which is written in the identification table 411, is first preset in the cyclic counter 412 by the central processing unit 410, and the count of the cyclic counter 412 is decremented with a clock signal (not shown) having a predetermined frequency. In the system where the time limit indicates the terminating date and time of allowance of reading the ciphered information, the cyclic counter 412 counts and outputs a current time. At each predetermined cycle, the central processing unit 410 reads the count of the cyclic counter 412, and determines whether or not the count has reached the time limit ΔT or the above remaining time ΔT' read from the rewritable area of the piece 1' of storage medium. When it is determined that the count has not reached the time limit ΔT or the above remaining time ΔT' read from the rewritable area of the piece 1' of storage medium, the central processing unit calculates the renewal value of the remaining time ΔT' as a difference between the count and the time limit ΔT or the above remaining time ΔT' read from the rewritable area of the piece 1' of storage medium, and rewrites the value of the remaining time ΔT' in the identification table 411. The subtracter 413 is used for obtaining the difference, and the comparator 414 is used for comparing the remaining time with zero, or comparing the current time with the terminating date and time. When it is determined that the count has reached the time limit ΔT or the above remaining time ΔT' read from the rewritable area of the piece 1' of storage medium, the central processing unit 410 writes "1" in the area of "INVALID FLAG", and clears the key information KY in the status memory 406 to stop the deciphering operation in the decipher circuit 405. Thus, the information written in the unrewritable area of the piece 1' of storage medium can no longer be read.

FIG. 6 is a flowchart of the operation of registering the identification table 411. In FIG. 6, when the command "START READ" is received in step 1001, the identification number written in the rewritable area of the piece 1' of storage medium is read, and the same identification number is searched for in the identification table 411 in step 1002. When it is determined in step 1003 that the same identification number is not registered in the identification table 411, the operation goes to step 1005, and the identification number read from the piece 1' of storage medium is newly registered in the identification table 411. When it is determined in step 1003 that the identification number is registered in the identification table 411, the operation goes to step 1004 to determine whether or not the invalid flag for the identification number is "1". When it is determined in step 1004 that the invalid flag for the identification number is "1", the operation goes to step 1008 to determine whether or not a command "END" for instructing to end the reading operation of the piece of storage medium is received. When it is determined in step 1009 that the command "END" is received, the operation goes to step 1010 to delete the identification number in the identification table 411. When it is determined in step 1009 that the command "END" is not received, the operation goes to step 1009 to determine whether or not a command "EXTENSION" for instructing an extension of the time limit is received. When it is determined in step 1009 that the command "EXTENSION" is received, the operation goes to step 1011 to obtain a further time limit as a time extension from the distributor apparatus 3'. The operation of obtaining the time extension is performed by transmitting a request for the time extension to the distributor apparatus 3' of FIG. 3 through the modem 430, and receiving a response allowing the time extension from the distributor apparatus. When transmitting the request and the response, information is ciphered before the transmission by using the cipher circuit (401 in FIG. 4), and deciphered after receiving the transmitted information by using the decipher circuit (403 in FIG. 4). Alternatively, the time extension may be obtained by inserting a prepaid card into a conventional prepaid card reading/writing mechanism (not shown) and then obtaining a time extension within the remaining amount of the prepaid card. After obtaining the time extension, the operation goes to step 1012 to write the obtained time extension in the entry corresponding to the identification number, and reset the invalid flag for the identification number in the identification table 411. Further, when the "EOF" code is detected, or when a command "STOP READ" is received in step 1006, the remaining time ΔT' is rewritten based on the count of the cyclic counter 412 as explained before. Then, the rewritten remaining time ΔT' is ciphered and written in the rewritable area of the piece 1' of storage medium as explained before.

Time Control operations in user Apparatus of FIG. 4 (FIGS. 7 to 10)

FIGS. 7 to 10 are timing diagrams of time control operations of the user apparatus indicated by FIGS. 4 and 5. In FIGS. 7 to 10, #1, #2, . . . indicate one hour, two hours, . . . counted in the user apparatus(es).

Figure 7:
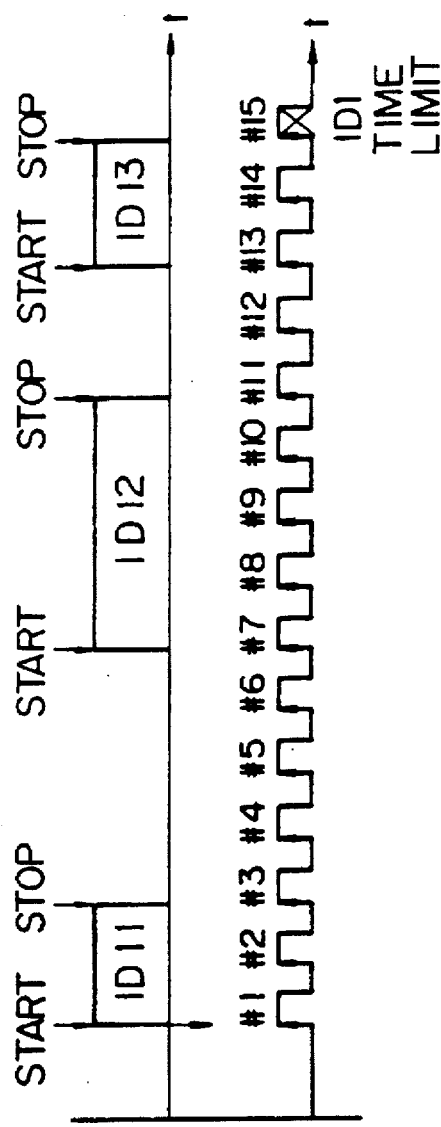
FIGS. 7 to 10 are timing diagrams of time control operations of the user apparatus indicated by FIGS. 4 and 5.

FIG. 7 is a timing diagram illustrating an example of the time control operation in the user apparatus 4' in the system wherein the time limit indicates a maximum limit duration counted from a time the piece 1' of storage medium is first read by the user apparatus regardless of interuptions in the reading operation. The counting of time starts when the first reading duration ID11 starts, and the counting is not stopped in the intervals between the durations ID11 and ID12, and between the durations ID12 and ID13.

Figure 8:
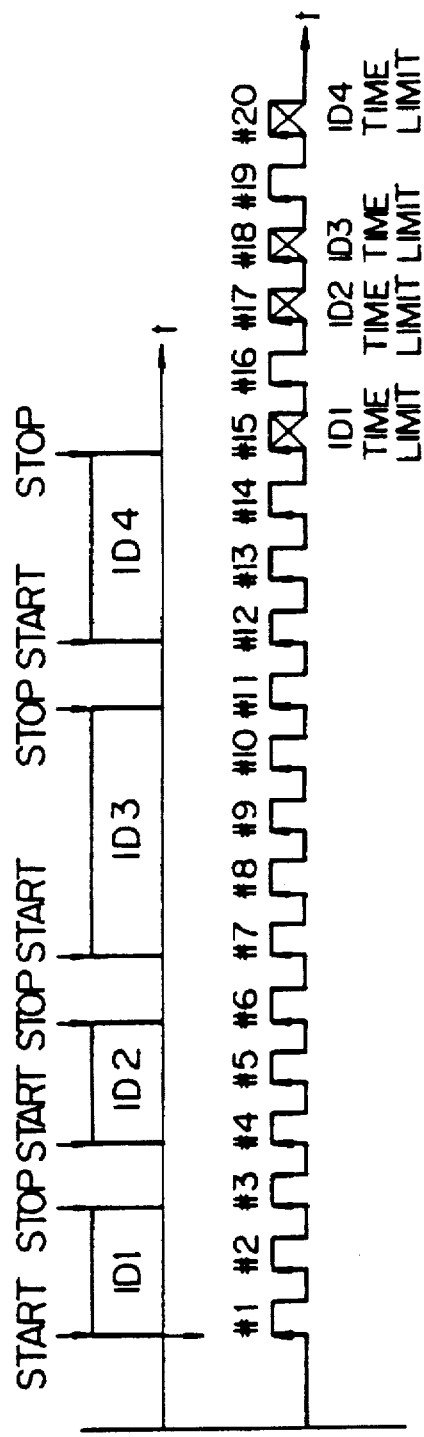

FIG. 8 is a timing diagram illustrating an example of the time control operation in the user apparatus 4' in the system wherein a plurality of pieces of storage medium are read in the same user apparatus, the time limits are given for the respective pieces of storage medium, and the respective time limits indicate maximum limit durations counted from times the pieces of storage medium are respectively first read by the user apparatus regardless of intermissions of the reading operations. In FIG. 8, ID1, ID2, ID3 and ID4 indicate durations of the reading operations of four pieces of storage medium, respectively. To realize this operation, although not shown, a plurality of counters are provided in the user apparatus for counting the elapses of the times for the respective pieces.

Figure 9:
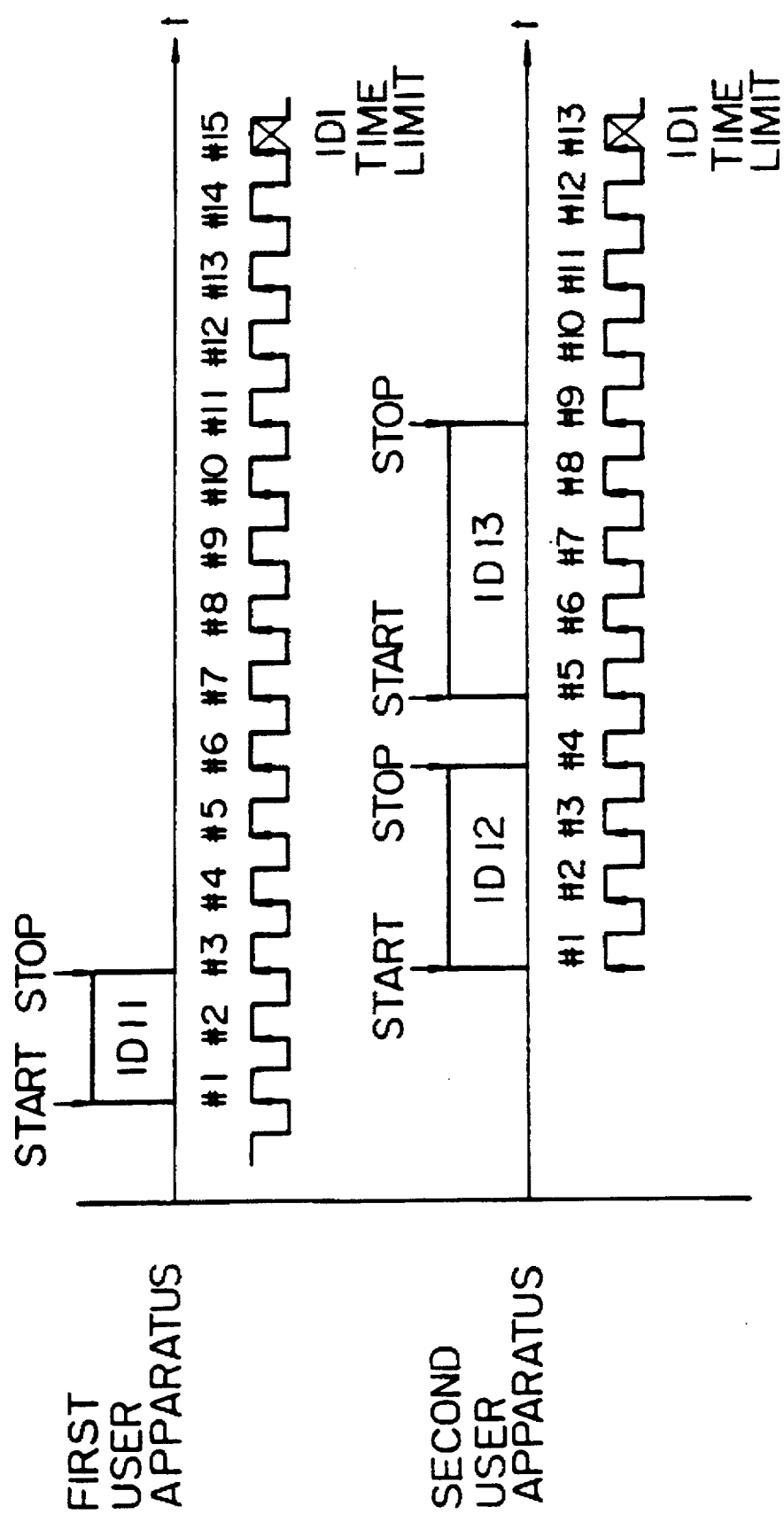

FIG. 9 is a timing diagram illustrating an example of the time control operations when a user reads a piece of storage medium successively in two user apparatuses. Initially, the time limit ΔT of fifteen hours is written in the piece of storage medium, and the value ΔT is rewritten to thirteen hours after the reading operation for two hours in the first user apparatus. Then, the piece of storage medium is inserted into the second user apparatus, and the time count starts when the first reading operation in the second user apparatus starts from the time limit ΔT of fifteen hours.

Figure 10:
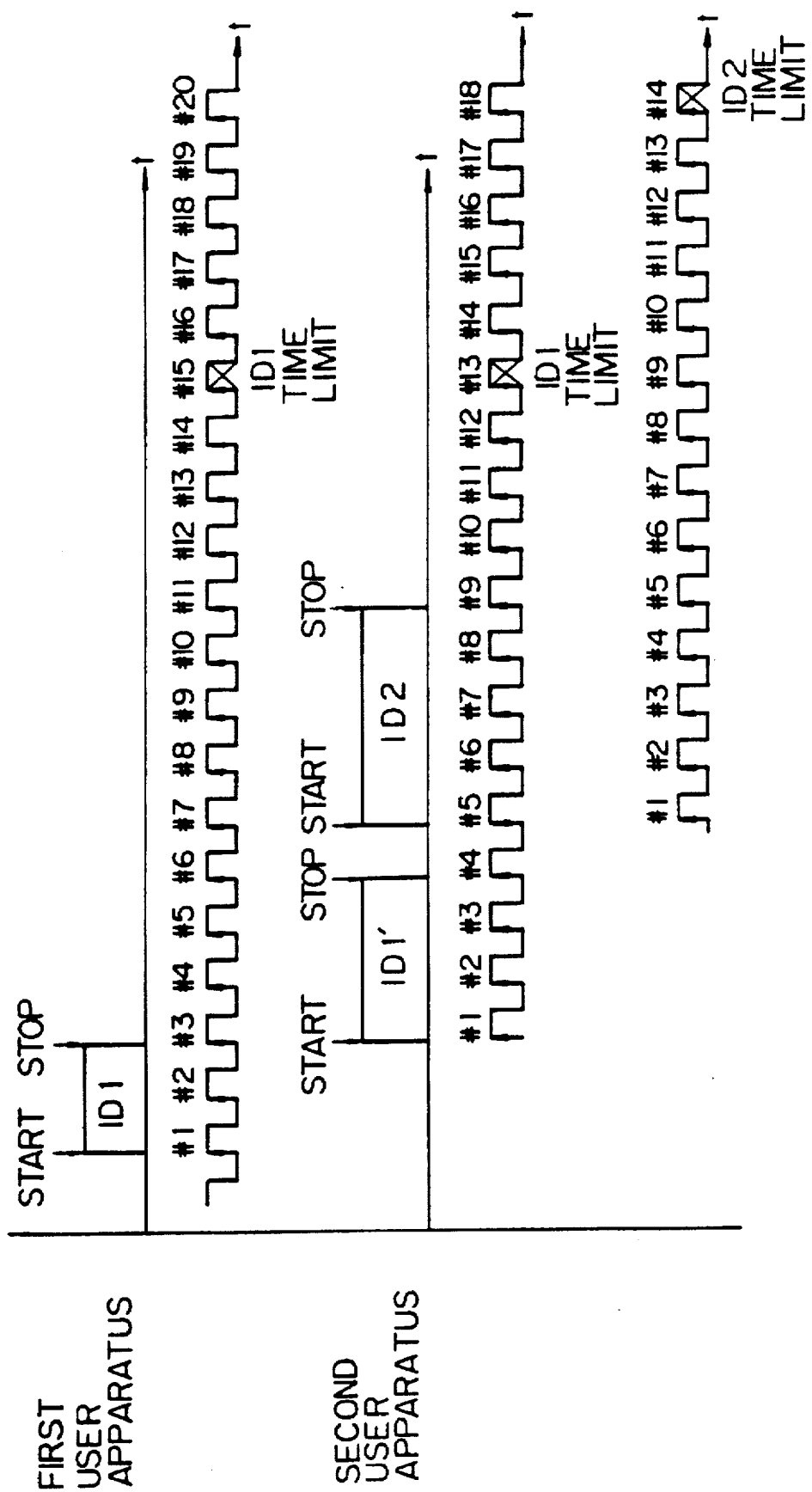

FIG. 10 is a timing diagram illustrating an example of the time control operations when a user reads a first piece of storage medium in the first user apparatus for two hours (the duration ID1), then reads the first piece of storage medium in the second user apparatus for three hours (the duration ID1'), and then reads a second piece of storage medium in the second user apparatus. Initially, the time limit ΔT of fifteen hours is written in the first piece of storage medium, and the time limit ΔT of fourteen hours is written in the second piece of storage medium. The value ΔT is rewritten to thirteen hours after the reading operation for two hours in the first user apparatus. Then, the first piece of storage medium is inserted into the second user apparatus, and the first time count starts when the first reading operation in the second user apparatus starts from the time limit ΔT of fifteen hours. In addition, When the second piece of storage medium is inserted into the second user apparatus, the second time count (which is independent of the first time count) starts when the first reading operation in the second user apparatus starts.

Figure 11:
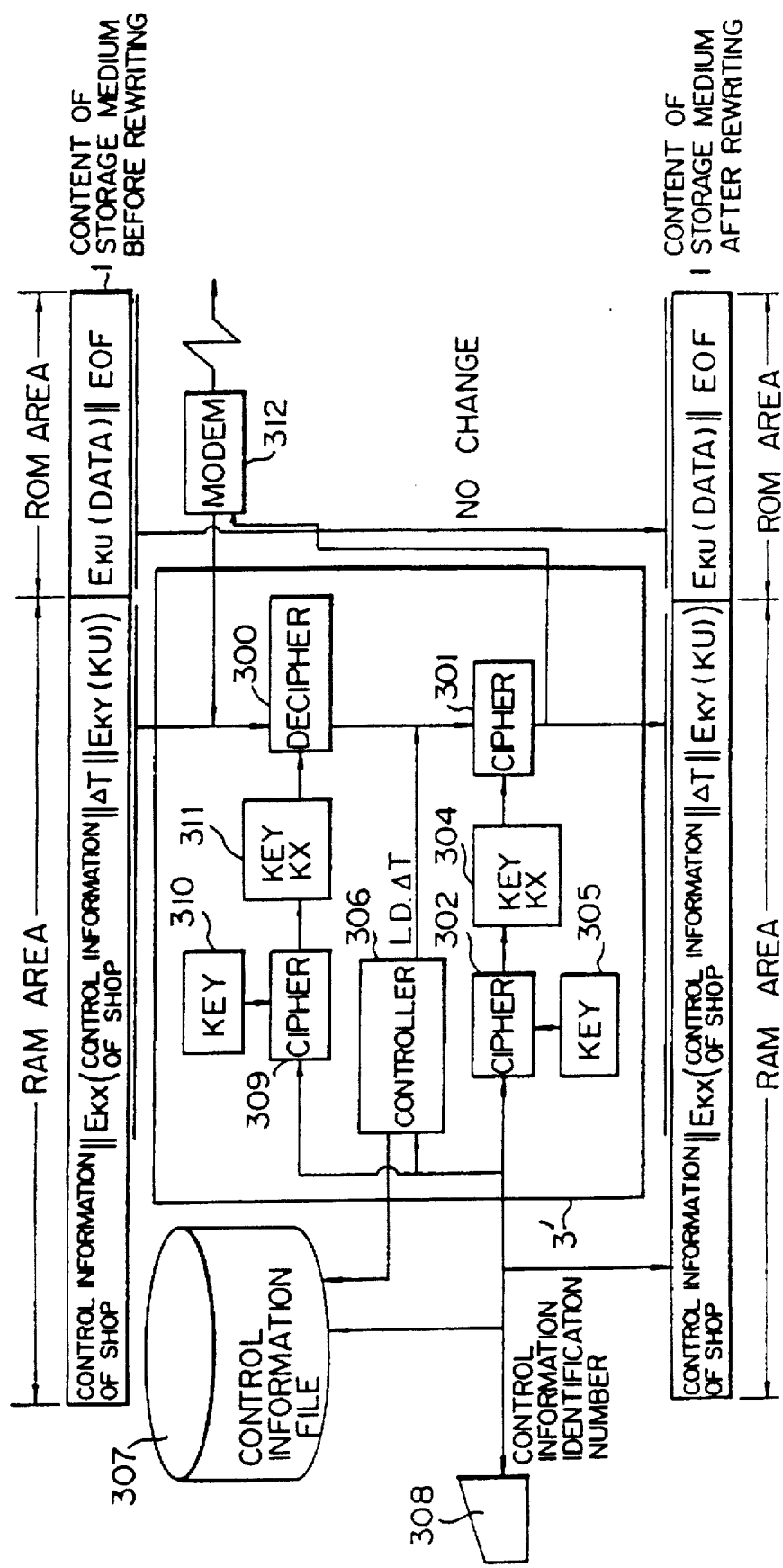
FIG. 11 is a diagram illustrating an additional construction of the distributor apparatus in the first embodiment of the present invention.

Further Function of Distributor Apparatus in First Embodiment of Present Invention (FIG. 11)

FIG. 11 is a diagram illustrating an additional construction of the user apparatus of FIG. 3 in the first embodiment of the present invention. In the construction of FIG. 11, in addition to key register 311 (not shown in FIG. 11), key registers 310 and 311, and a cipher circuit 309 are provided for reading the ciphered information written by the user apparatus 4'. The additional construction of the key registers 310 and 311 and the cipher circuit 309 is provided for generating the key information KX from the identification number of the piece 1' of storage medium to supply the same to the decipher circuit 300 for deciphering the ciphered information $E_{KX}$(CONTROL INFORMATION/ΔT/$E_{KY}$(KU)) written by the user apparatus 4'.

When a user has used a piece of storage medium (has read information stored in the piece of storage medium) up to full of the time limit, the user brings the piece of storage medium back to the distributor apparatus to return the rented piece of storage medium to the distributor (rental shop), or to have an additional time limit written by the distributor apparatus in the piece of storage medium. When such a piece of storage medium is inserted into the storage medium reading/writing mechanism of the distributor apparatus 3' in FIG. 11, and a predetermined command for instructing to read the information written by a user in the rewritable area of the piece of storage medium is input through the operator's console 308 to the controller 309, the ciphered information $E_{KX}$ (CONTROL INFORMATION/ΔT/$E_{KY}$(KU)) written in the rewritable area is read and supplied to the decipher circuit 300. As mentioned above, the key information KX is supplied to the decipher circuit 300, and the decipher circuit 300 deciphers the ciphered information $E_{KX}$(CONTROL INFORMATION/ΔT/$E_{KY}$(KU)) by using the key information KX to regenerate the control information, the remaining time ΔT, and the ciphered key information $E_{KY}$(KU)). Then, the deciphered information is supplied to the controller 306. Thus, the controller 306 can obtain information on used amount, indicating how much the respective users have used the pieces of storage medium, and other information relating to the users. Based on the information on used amount, the distributor apparatus in a rental shop can calculate a charge for rent.

Further, the distributor apparatus can obtain information on whether or not illegal use occurs. Since the distributor apparatus can obtain a total amount of the time limits for each information item based on the information on amounts of the time limits for respective pieces of storage medium for the information item distributed therefrom, the distributor apparatus can compare the total amount of time limits distributed therefrom, with a total amount of the used amounts read from the pieces of storage medium which are returned from users to the distributor apparatus. When the used amounts read from the pieces of storage medium which are returned from users to the distributor apparatus, is greater than the total amount of time limits distributed from the distributor apparatus, the distributor apparatus can recognize that illegal use has occurred. The result of the comparison may be displayed on a display which may be provided at the operator's console 308. Alternatively, this comparison may be performed at the supplier apparatus instead of the distributor apparatus. Further, although not shown, a control center apparatus may be provided in the first embodiment as explained later in the second embodiment, and the comparison may be performed in the control center apparatus.

In addition to the above function, the controller 306 in the distributor apparatus of FIG. 11 (FIG. 3) can receive the request for the additional time limit from the user apparatus 4' through the modem 312 and the decipher circuit 300, and issue the additional time limit in accordance with a predetermined contract condition between the user and the distributor, which is stored in the control information file 307. The issued additional time limit can be ciphered by the cipher circuit 301, and is then transmitted through the modem 316 to the user apparatus 4'.

Figure 12:
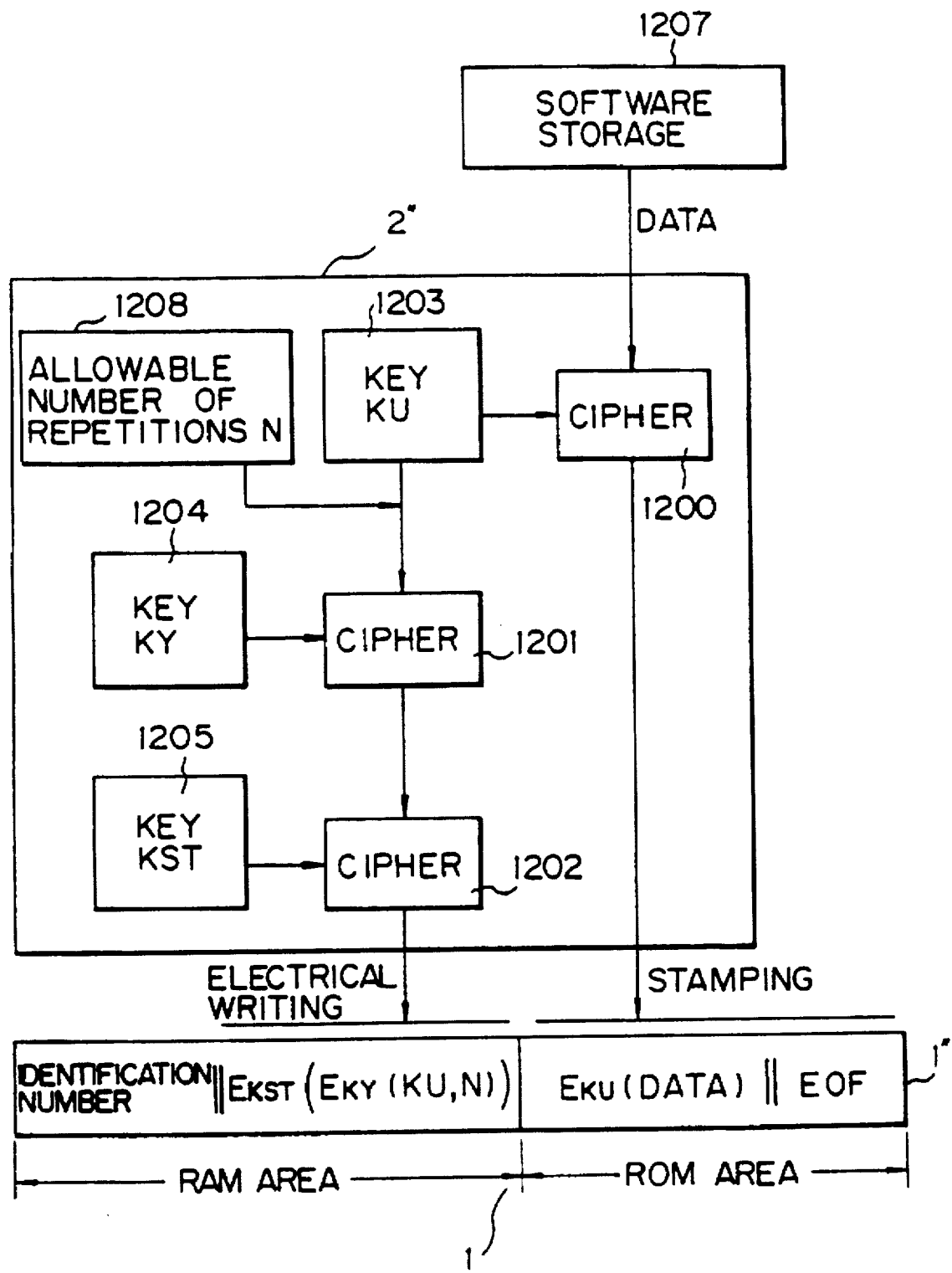
FIG. 12 is a diagram illustrating an example of construction of a supplier apparatus in the second embodiment of the present invention.

Supplier Apparatus in Second Embodiment of Present Invention (FIG. 12)

FIG. 12 is a diagram illustrating an example of construction of a supplier apparatus in the second embodiment of the present invention. In the second embodiment, each piece of storage medium stores the limit number information indicating the maximum allowed number of repetitions of the operation of reading the information stored in the unrewritable area of the piece of storage medium. In FIG. 12, reference numeral 1" denotes a content of a piece of storage medium, 2" denotes the supplier apparatus, 1200, 1201 and 1202 each denote a cipher circuit, 1203, 1204 and 1205 each denote a key register, 1207 denotes a software storage, and 1208 denotes an allowable-number-of-repetition register.

The construction of FIG. 12 and the operation thereof are basically the same as the construction of FIG. 2 and the operation thereof except that the allowable-number-of-repetition register 1208 is provided in the construction of FIG. 12. The allowable-number-of-repetition register 1208 holds and outputs a maximum allowable number N of repetitions of the operation of reading the information stored in the unrewritable area of each piece of storage medium. The maximum allowable number N of repetitions output from the allowable-number-of-repetition register 1208 and the key information KU output from the key register 1203 are supplied to the cipher circuit 1201 to be ciphered. The cipher circuit 1201 ciphers the maximum allowable number N of repetitions and the key information KU by using the key information KY which is supplied from the key register 1204 to generate ciphered information $E_{KY}$(KU, N). The ciphered information $E_{KY}$(KU, N) is further ciphered by the cipher circuit 1202 by using the key information KST which is supplied from the key register 1205, to generate ciphered information $E_{KST}$($E_{KY}$(KU, N)). The ciphered information $E_{KST}$($E_{KY}$(KU, N)) is then electrically written in the rewritable area of each piece 1" of storage medium. The each piece 1" of storage medium is held in a conventional storage medium holding mechanism (not shown) in a conventional storage medium reading/writing mechanism (not shown). As indicated in FIG. 12, an identification number of the piece 1" of storage medium is also written in the rewritable area of the piece of storage medium. In addition, information to be distributed, is stored in the software storage 1207, and is supplied to the cipher circuit 1200. The information to be distributed, is ciphered by the cipher circuit 1200 by using the key information KU to generate ciphered information EKU(DATA), and the ciphered information EKU(DATA) is stamped (written in an unrewritable manner) in the unrewritable area of the piece 1" of storage medium.

Figure 13:
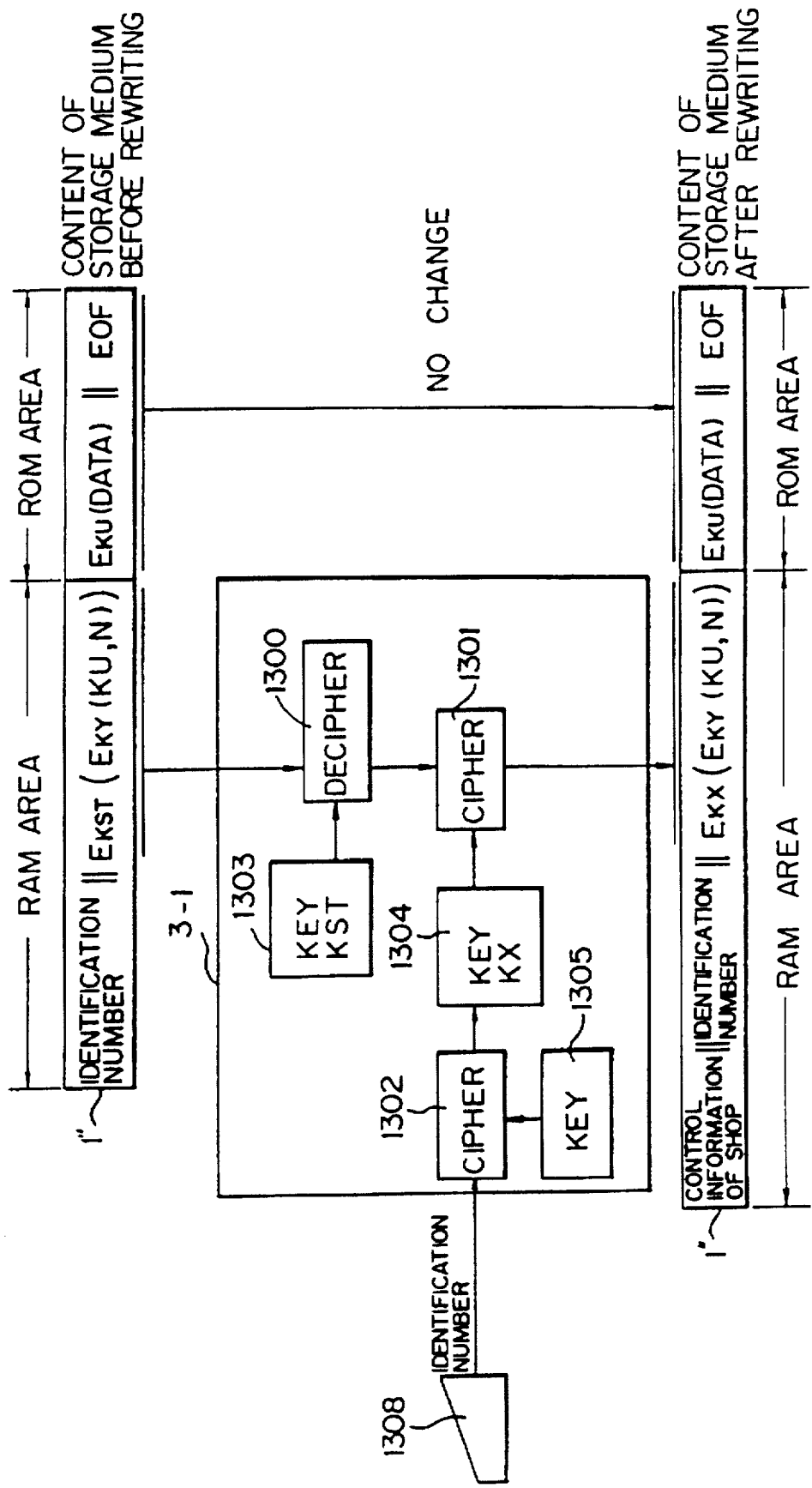
FIG. 13 is a diagram illustrating a first example of construction of a distributor apparatus in the second embodiment of the present invention.

Distributor Apparatus in Second Embodiment of Present Invention (FIG. 13)

FIG. 13 is a diagram illustrating an example of construction of a distributor apparatus in the second embodiment of the present invention. In the second embodiment, similar to the construction of FIG. 3, the distributor apparatus 3-1 has a function of converting the above ciphered information EKST(EKY(KU, N)) ciphered by using the key information KST, to other ciphered information EKX(EKY(KU, N)) which is ciphered by using other key information KX. In FIG. 13, reference numeral 3-1 denotes a distributor apparatus, 1300 denotes a decipher circuit, 1301 denotes a cipher circuit, 1301 and 1302 each denote a decipher circuit, and 1303, 1304, and 1305 each denote a key register.

When the piece 1" of storage medium, in which the ciphered information is written by the supplier apparatus of FIG. 12, as explained above, is inserted into in a conventional storage medium holding mechanism (not shown) in a conventional storage medium reading/writing mechanism (not shown) in the distributor apparatus 3-1 of FIG. 13, and a predetermined command for instructing the conversion of the ciphered information is input into a controller (not shown) of the distributor apparatus 3-1, the ciphered information EKST(EKY(KU, N)) is read from the rewritable area of the piece 1" of storage medium, and is supplied to the decipher circuit 1300. The decipher circuit 1300 deciphers the ciphered information EKST(EKY(KU, N)) by using the key information KX which is supplied to the decipher circuit 1300 from the key register 1303. Thus, the ciphered information EKY(KU, N) is regenerated by the decipher circuit 1300. The ciphered information EKY(KU, N) is then supplied to the cipher circuit 1301 to be ciphered therein. The cipher circuit 1301 further ciphers the ciphered information EKY(KU, N) by using the key information KX which is held in the key register 1304, and which is supplied to the cipher circuit 1301. Thus, ciphered information EKX(EKY(KU, N)) is generated by the cipher circuit 1300. The key information KX is generated from an identification number of the piece 1" of storage medium by the cipher circuit 1302 by using key information supplied from the key register 1305. The ciphered information EKX(EKY(KU, N)) is then written in the rewritable area of the piece 1" of storage medium instead of the ciphered information EKST(EKY(KU, N)).

Although not explained here, the control information which is input from the operator's console 1308, can be written in the rewritable area of the piece 1" of storage medium in the same manner as the construction of FIG. 3.

Although the construction for generating and ciphering the limit number information indicating the maximum allowable number of repetitions of the operation of reading the information written in the unrewritable area of the piece of storage medium, is provided in the supplier apparatus of FIG. 12 in the second embodiment, the construction for generating and ciphering the limit number information may be provided in the distributor apparatus of FIG. 13. In this case, the construction relating to the limit number information in the distributor apparatus can be realized in a manner similar to the construction relating to the time limit information in the distributor apparatus in FIGS. 3 and 11.

Figure 14:
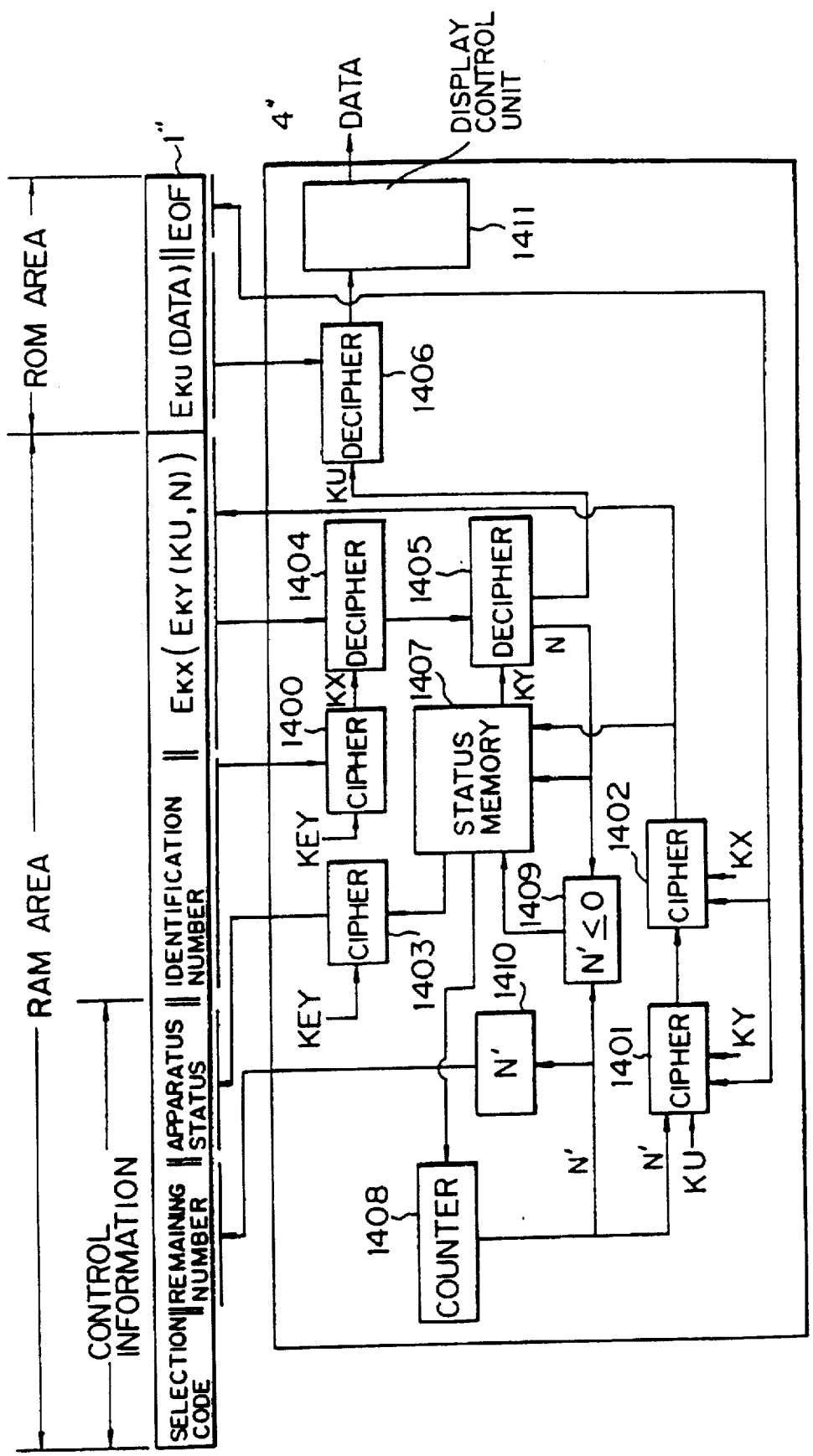
FIG. 14 is a diagram illustrating an example of construction of a user apparatus in the second embodiment of the present invention.

User Apparatus in Second Embodiment of Present Invention (FIG. 14)

FIG. 14 is a diagram illustrating an example of construction of a user apparatus in the second embodiment of the present invention. In FIG. 14, reference numeral 4' denotes a user apparatus, 1400, 1401, 1402 and 1403 each denote a cipher circuit, 1404, 1405 and 1406 each denote a decipher circuit, 1407 denotes a status memory, 1408 denotes a counter, 1409 denotes a comparator, 1410 denotes a number register, and 1411 denotes a display control unit.

When the piece 1" of storage medium, in which the ciphered information is written by the distributor apparatus as explained above, is inserted into a conventional storage medium reading/writing mechanism (not shown) in the user apparatus 4" of FIG. 14, and a predetermined command for instructing to read the information written in the unrewritable area of the piece of storage medium is input from an operator's console (not shown) to a controller (not shown) of the user apparatus, first, the identification number written in the rewritable area of the piece of storage medium is read to be supplied to the cipher circuit 1400. The cipher circuit 1400 ciphers the image data by using key information supplied thereto. The key information supplied to the cipher circuit 1400 is the same key information as that the key register 1305 in FIG. 13 outputs. Thus, the cipher circuit 1400 generates the key information KX to supply the same to the decipher circuit 1404. The ciphered information EKX(EKY(KU, N)) written in the rewritable area of the piece of storage medium is read to be supplied to the decipher circuit 1404, as information to be deciphered. The decipher circuit 1400 deciphers the ciphered information EKX(EKY (KU, N)) by using the key information KX to regenerate the ciphered information EKY(KU, N). The regenerated ciphered information EKY(KU, N) is then supplied to the decipher circuit 1407.

The status memory 1407 is backed up by a battery, and stores key information KY, which is the same as the key information KY held in the key register 1204 in FIG. 12. The key information KY is supplied to the decipher circuit 1405, and the decipher circuit 1405 deciphers the ciphered information EKY(KU, N) by using the key information KY to regenerate the maximum allowable number N of repetitions of the operation of reading the information written in the unrewritable area of the piece of storage medium, and the key information KU. The key information KU is supplied to the status memory 1407 to be written therein, and is supplied to the decipher circuit 1406 as key information to be used for deciphering the ciphered information EKU(DATA). The ciphered information EKU(DATA) written in the unrewritable area of the piece of storage medium, is read therefrom to be supplied to the decipher circuit 1406, and the decipher circuit 1406 deciphers the ciphered information EKU(DATA) by using the key information KU to regenerate the information to be distributed. The regenerated information is then supplied to the display control circuit 1411 to display the information.

The maximum allowable number N of repetitions regenerated by the decipher circuit 1405 is written in the status memory 1407, and is supplied to the comparator 1409. When the comparator 1409 receives the maximum allowable number N, the comparator 1409 determines whether or not the number N is equal to zero. When the number N is equal to zero, the comparator 149 outputs a signal to clear the value of the key information KU in the status memory 1407, and stop the deciphering operation of the decipher circuit 1406.

The above maximum allowable number N of repetitions is also supplied to the counter to preset the number N therein. The count of the counter 1408 is decremented when the EOF code is detected after completing the reading of the information EKU(DATA) from the unrewritable area of the piece of storage medium, and when the operation of reading the information $E_{KU}(DATA)$ is quit in response to an input of a predetermined command for instructing a quit of the reading operation from an operator's console (not shown). Alternatively, the count of the counter 1408 may be decremented by one when each reading operation starts to generate a decremented number N'. Then, the decremented number N' is output from the counter 1408 to be supplied to the cipher circuit 1401, the comparator 1409, and the register 1410. The decremented number N' is latched in the register, and is then written in the rewritable area of the piece of storage medium as a remaining number. The cipher circuit 1401 receives the decremented number (remaining number) N' together with the key information KU which is supplied from the status memory 1407, and ciphers the information by using the key information KY to generate ciphered information $E_{KY}(KU, N')$. Then, the ciphered information $E_{KY}(KU, N')$ is further ciphered by the cipher circuit 1402 by using the key information KX to generate ciphered information $E_{KX}(E_{KY}(KU, N'))$. The ciphered information $E_{KX}(E_{KY}(KU, N'))$ is written in the rewritable area of the piece of storage medium instead of the ciphered information $E_{KX}(E_{KY}(KU, N))$. In addition, the comparator 1409 compares the above decremented number (remaining number) N' with zero. When the decremented number N' is equal to zero, the comparator 1409 outputs the clear signal to clear the value of the key information KU stored in the status memory 1407, and stop the deciphering operation of the decipher circuit 1406.

According to the above construction, the user cannot use (read) the information written in the unrewritable area of the piece of storage medium more than N times, where N is the maximum allowable number of repetitions of the operation of reading the information in the piece of storage medium. Namely, the undue profit which a person who illegally uses information stored in the piece of storage medium may obtain, is reduced.

Although not shown, the user apparatus of FIG. 14 can further comprise a modem as that in the construction of FIG. 4 to communicate with the supplier apparatus or the distributor apparatus, and the supplier apparatus or the distributor apparatus may have the function of issuing an additional limit number in a manner similar to the function of issuing the additional time limit in the first embodiment. When such provision is made in the information distribution system, the user can obtain an additional limit number by inputting a command for requesting the same. In response to the command, the controller in the user apparatus transmits a request through the modem to the above supplier apparatus or the distributor apparatus, and receives a response allowing the additional limit number.

Figure 15:
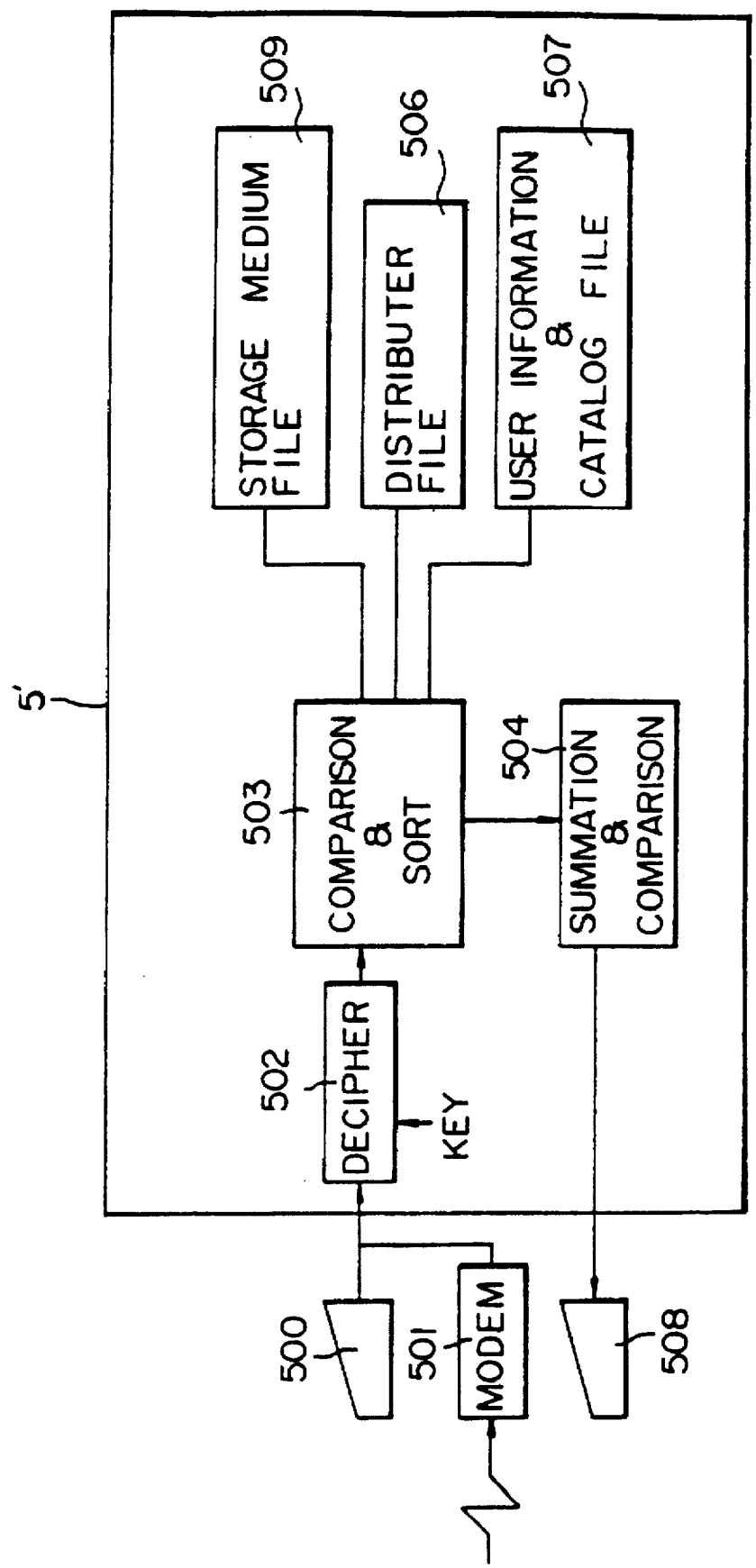
FIG. 15 is a diagram illustrating an example of construction of a control enter apparatus 5' in the second embodiment of the present invention.

Control Center Apparatus in Second Embodiment of Present Invention (FIG. 15)

FIG. 15 is a diagram illustrating an example of construction of a control enter apparatus 5' in the second embodiment of the present invention. In FIG. 15, reference numeral 5' denotes a control center apparatus, 500 denotes a storage medium reader unit, 501 denotes a modem unit, 502 denotes a decipher circuit, 503 denotes a comparison & sort unit, 504 denotes a summation & comparison unit, 505 denotes a storage medium file, 506 denotes a distributor file, and 507 denotes a user information & catalog file.

As indicated in FIG. 1, the control center apparatus is connected to the supplier apparatus and the distributor apparatus through communication channels, respectively. Through the communication channels, each supplier apparatus in the system transmits to the control center apparatus 5' information on the pieces of storage medium supplied therefrom and information items written in the pieces of storage medium, to store the information in the storage medium file 505. The above information transmitted to the control center apparatus 5' includes the maximum allowable numbers N of repetitions written in the pieces of storage medium. In addition, each distributor apparatus in the system transmits through the communication channels to the control center apparatus 5' information on the pieces of storage medium distributed from the distributor apparatus to store the information in the distributor file 506. Each distributor apparatus further transmits through the communication channels to the control center apparatus 5' information on the users to which the respective pieces of storage medium are distributed from the distributor apparatus, to store the information in the user information & catalog file 507. The information on the users includes the remaining numbers written in the pieces of storage medium which have been returned to the distributor apparatuses or the supplier apparatuses. Thus, the control center apparatus 5' can collect all the information relating to the distribution of all of the pieces of storage medium within the information distribution system.

When the comparison & sort unit 503 receives an identification number of the information item through the decipher circuit 502, the comparison & sort unit 503 collects information for the identification number (information item) from the storage medium file 505, the distributor file 506, and the user information & catalog file 507, and supplies the same to the summation & comparison unit 504. Receiving the information for the identification number, the summation & comparison unit 504 calculates a sum of the maximum allowable numbers issued in the supplier apparatuses in the system, and a sum of use numbers based on differences between the maximum allowable numbers issued in the supplier apparatuses in the system, and the corresponding remaining numbers written in the pieces of storage medium which have been returned to the distributor apparatuses or the supplier apparatuses, respectively. Then, it is determined whether or not the sum of the use numbers is greater than the sum of the maximum allowable numbers issued in the supplier apparatuses in the system. When yes is determined, an occurrence of illegal use of the information item can be recognized.

We claim:

1. A distributor apparatus comprising:
   piece of storage medium holding means for temporarily holding a piece of storage medium which contains first and second areas for storing first and second ciphered information, respectively, and said second ciphered information indicates a limit for an operation of reading the first ciphered information;
   limit information generating means for generating limit information indicating the limit of the operation of reading the first ciphered information;
   key storing means for storing key information;
   ciphering means for ciphering the limit information, by using the key information in the key storing means, to generate the second ciphered information;
   writing means for writing the second ciphered information in the second area of the piece of storage medium held in the piece of storage medium holding means; and
   communication means for receiving a request for an additional limit information for reading the first ciphered information from a user apparatus and for transmitting the additional limit information to the user apparatus.

2. A user apparatus comprising:

piece of storage medium holding means for temporarily holding a piece of storage medium which contains first and second areas for storing first and second ciphered information, respectively, said second ciphered information indicating a limit of an operation of reading the first ciphered information;

first reading means for reading the first information written in the first area of the piece of storage medium held in the piece of storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information written in the second area of the piece of storage medium held in the piece of storage medium holding means;

second deciphering means for deciphering the second ciphered information read by the second reading means, by using the second key information stored in the second key storing means, to obtain limit information indicating the limit of the operation of reading the first ciphered information;

amount-of-use obtaining means for obtaining an amount of the operation of reading the first ciphered information performed in the user apparatus;

over-limit determining means for determining whether the amount of the operation obtained by the amount-of-use obtaining means has reached the limit indicated by the limit information obtained by the second deciphering means;

stop means for stopping the operation of reading the first ciphered information when the over-limit determining means determines that the amount of the operation obtained by the amount-of-use obtaining means has reached the limit; and communication means for transmitting a request for an additional limit information for reading the first ciphered information to a distributer apparatus and for receiving the additional limit information from the distributer apparatus.

3. A distributor apparatus comprising:

storage medium holding means for temporarily holding a storage medium which contains first and second areas for storing first and second ciphered information, respectively, and said second ciphered information indicates a maximum allowable accumulated time for an operation of reading the first ciphered information;

time limit information generating means for generating time limit information indicating the maximum allowable accumulated time;

key storing means for storing key information;

ciphering means for ciphering the time limit information, by using the key information stored in the key storing means, to generate the second ciphered information;

writing means or writing the second ciphered information in the second area of the storage medium held in the storage medium holding means; and communication means for receiving a request for an additional time information for reading the first ciphered information from a user apparatus and for transmitting the additional time information for reading the first ciphered information to the user apparatus.

4. A user apparatus comprising:

storage medium holding means for temporarily holding a storage medium which contains first and second areas for storing first and second ciphered information, respectively, and said second ciphered information indicates a maximum allowable accumulated time for an operation of reading the first ciphered information;

first reading means for reading the first information written in the first area of the storage medium held in the storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information read by the second reading means, by using the second key information stored in the second key storing means, to obtain time limit information indicating the maximum allowable accumulated time;

time accumulating means for obtaining an accumulated duration by counting and accumulating at least one duration of the operation of reading the first ciphered information by the first reading means;

time-over determining means for determining whether or not the accumulated duration obtained by the time accumulating means has reached the maximum allowable accumulated time obtaining by the second deciphering means;

stop means for stopping the operation of reading the first ciphered information when the time-over determining means determines that the accumulated duration obtained by the time accumulating means has reached the maximum allowable accumulated time obtained by the second deciphering means; and communication means for transmitting a request for an additional time information for reading the first ciphered information to a distributer apparatus and for receiving the additional time information for reading the first ciphered information from the distributer apparatus.

5. A distributor apparatus comprising:

storage medium holding means for temporarily holding a storage medium which contains first and second areas for storing first and second ciphered information, respectively, and said second ciphered information indicates a maximum allowable number of repetitions of an operation of reading the first ciphered information;

limit number information generating means for generating limit number information indicating the maximum allowable number of repetitions;

key storing means for storing key information;

ciphering means for ciphering the limit number information, by using the key information stored in the key storing means, to generate the second ciphered information;

writing means for writing the second ciphered information in the second area of the storage medium held in the storage medium holding means; and communication means for receiving a request for an additional allowable number of repetitions information for reading the first ciphered information from a user apparatus and for transmitting the additional allowable number of repetitions information for reading the first ciphered information to the user apparatus.

6. A user apparatus comprising:

storage medium holding means for temporarily holding the storage medium which contains first and second areas for storing first and second ciphered information, respectively, and said second ciphered information indicates a maximum allowable number of repetitions of an operation of reading the first ciphered information;

first reading means for reading the first ciphered information written in the first area of the storage medium held in the storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information written in the second area of the storage medium held in the storage medium holding means;

second deciphering means for deciphering the second ciphered information read by the second reading means, by using the second key information stored in the second key storing means, to obtain limit number information indicating the maximum allowable number of repetitions;

repetition number counting means for obtaining a number of repetitions of the operation of reading the first ciphered information;

repetition number over determining means for determining whether or not the number of repetitions obtained by the repetition number over determining means has reached the maximum allowable number of repetitions obtained by the second deciphering means;

stop means for stopping the operation of reading the first ciphered information when the number of repetitions obtained by the repetition number over determining means has reached the maximum allowable number of repetitions obtained by the second deciphering means; and communication means for transmitting a request for an additional allowable number of repetitions information for reading the first ciphered information to a distributer apparatus and for receiving the additional allowable number of repetitions information for reading the first ciphered information from the distributer apparatus.

7. A distributor apparatus comprising:

storage medium holding means for temporarily holding a storage medium containing first and second areas for storing first and second ciphered information, respectively, said second ciphered information indicating a time limit for an operation of reading the first ciphered information by a user apparatus;

time limit information generating means for generating time limit information indicating the time limit;

key storing means for storing key information;

ciphering means for ciphering the time limit information, by using the key information stored in the key storing means, to generate the second ciphered information;

writing means for writing the second ciphered information in the second area of the storage medium held in the storage medium holding means; and communication means for receiving a request for an additional time limit information for reading the first ciphered information from a user apparatus and for transmitting the additional time limit information for reading the first ciphered information to the user apparatus.

8. A user apparatus comprising:

storage medium holding means for temporarily holding a storage medium containing first and second areas for storing first and second ciphered information, respectively, said second ciphered information indicating a time limit for an operation of reading the first ciphered information;

first reading means for reading the first ciphered information written in the first area of the storage medium held in the storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information written in the second area of the storage medium held in the storage medium holding means;

second deciphering means for deciphering the second ciphered information read by the second reading means, by using the second key information stored in the second key storing means, to obtain time limit information indicating the time limit;

time counting means for obtaining a time elapsed from a timing at which the time limit information is obtained;

time-over determining means for determining whether the time elapsed from a time at which the time limit information is obtained, has reached the time limit obtained by the second deciphering means;

stop means for stopping the operation of reading the first ciphered information if the time-over determining means determines that time elapsed from the timing at which the time limit information is obtained has reached the time limit obtained, by the second deciphering means; and communication means for transmitting a request for an additional time limit information for reading the first ciphered information to a distributer apparatus and for receiving the additional time limit information for reading the first ciphered information from the distributer apparatus.

9. A distributor apparatus comprising:

piece of storage medium holding means for temporarily holding a piece of storage medium which contains first and second areas for storing first and second ciphered information, respectively, and said second ciphered information indicates a limit for an operation of reading the first ciphered information;

limit information generating means for generating limit information indicating the limit of the operation of reading the first ciphered information;

key storing means for storing key information;

ciphering means for ciphering the limit information, by using the key information stored in the key storing means, to generate the second ciphered information;

writing means for writing the second ciphered information in the second area of the piece of storage medium held in the piece of storage medium holding means;

reading means for reading the limit information renewed by a user apparatus from the piece of storage medium when the piece of storage medium is returned from the user apparatus; and amount-of-use detecting means for detecting an amount of the operation of reading the first ciphered information performed in the user apparatus, based upon the renewed limit information read-out from the piece of storage medium returned from the user apparatus.

10. A user apparatus comprising:

piece of storage medium holding means for temporarily holding a piece of storage medium which contains first and second areas for storing first and second ciphered information, respectively, said second ciphered information indicating a limit of an operation of reading the first ciphered information;

first reading means for reading the first information written in the first area of the piece of storage medium held in the piece of storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information written in the second area of the piece of storage medium held in the piece of storage medium holding means;

second deciphering means for deciphering the second ciphered information read by the second reading means, by using the second key information stored in the second key storing means, to obtain limit information indicating the limit of the operation of reading the first ciphered information;

amount-of-use obtaining means for obtaining an amount of the operation of reading the first ciphered information performed in the user apparatus;

over-limit determining means for determining whether the amount of the operation obtained by the amount-of-use obtaining means has reached the limit indicated by the limit information obtained by the second deciphering means; and stop means for stopping the operation of reading the first ciphered information when the over-limit determining means determines that the amount of the operation obtained by the amount-of-use obtaining means has reached the limit; and limit information renewing means for renewing the second ciphered information in the second area of the piece of storage medium.

11. A user apparatus according to claim 10, wherein said limit information renewing means further comprises:

remaining amount determining means for determining as a remaining amount a different between the limit of the operation of reading the first ciphered information indicated by the limit information obtained by the second deciphering means and the amount of the operation obtained by the amount-of-use obtaining means;

ciphering means for ciphering information on the remaining amount, by using the second key information stored in the second key storing means, to generate a renewal data of the second ciphered information; and writing means for writing the renewal data of the second ciphered information in the second area of the piece of storage medium held in the piece of storage medium holding means.

12. A distributor apparatus comprising:

storage medium holding means for temporarily holding a storage medium which contains first and second areas for storing first and second ciphered information, respectively, and said second ciphered information indicates a maximum allowable accumulated time for an operation of reading the first ciphered information;

time limit information generating means for generating time limit information indicating the maximum allowable accumulated time;

key storing means for storing key information;

ciphering means for ciphering the time limit information, by using the key information stored in the key storing means, to generate the second ciphered information;

writing means for writing the second ciphered information in the second area of the storage medium held in the storage medium holding means;

reading means for reading the time limit information renewed by a user apparatus from the storage medium when the storage medium is returned from the user apparatus; and amount-of-use detecting means for detecting an amount of the operation of reading the first ciphered information performed in the user apparatus, based upon the renewed limit information read-out from the storage medium returned from the user apparatus.

13. A user apparatus comprising:

storage medium holding means for temporarily holding a storage medium which contains first and second areas for storing first and second ciphered information, respectively, and said second ciphered information indicates a maximum allowable accumulated time for an operation of reading the first ciphered information;

first reading means for reading the first information written in the first area of the storage medium held in the storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information written in the second area of the storage medium held in the storage medium holding means;

second deciphering means for deciphering the second ciphered information read by the second reading means, by using the second key information stored in the second key storing means, to obtain time limit information indicating the maximum allowable accumulated time;

time accumulating means for obtaining an accumulated duration by counting and accumulating at least one duration of the operation of reading the first ciphered information by the first reading means;

time-over determining means for determining whether or not the accumulated duration obtained by the time accumulating means has reached the maximum allowable accumulated time obtained by the second deciphering means;

stop means for stopping the operation of reading the first ciphered information when the time-over determining means determines that the accumulated duration obtained by the time accumulating means has reached the maximum allowable accumulated time obtained by the second deciphering means; and time limit information renewing means for renewing the second ciphered information in the second area of the storage medium.

14. A user apparatus according to claim 13, wherein said time limit information renewing means further comprises:

remaining time determining means for determining as a remaining time a time difference between the maximum allowable accumulated time obtained by the second deciphering means and the accumulated duration obtained by the time accumulating means;

ciphering means for ciphering information on the remaining time, by using the second key information stored in the second key storing means, to generate a renewal data of the second ciphered information; and writing means for writing the renewal data of the second ciphered information in the second area of the storage medium held in the storage medium holding means.

15. A distributor apparatus comprising:

storage medium holding means for temporarily holding a storage medium which contains first and second areas for storing first and second ciphered information, respectively, and said second ciphered information indicates a maximum allowable number of repetitions of an operation of reading the first ciphered information;

limit number information generating means for generating limit number information indicating the maximum allowable number of repetitions;

key storing means for storing key information;

ciphering means for ciphering the limit number information, by using the key information stored in the key storing means, to generate the second ciphered information;

writing means for writing the second ciphered information in the second area of the storage medium held in the storage medium holding means;

reading means for reading the limit number information renewed by a user apparatus from the storage medium when the storage medium is returned from the user apparatus; and amount-of-use detecting means for detecting an amount of the operation of reading the first ciphered information performed in the user apparatus, based upon the renewed limit number information read-out from the storage medium returned from the user apparatus.

16. A user apparatus comprising:

storage medium holding means for temporarily holding the storage medium which contains first and second areas for storing first and second ciphered information, respectively, and said second ciphered information indicates a maximum allowable number of repetitions of an operation of reading the first ciphered information;

first reading means for reading the first ciphered information written in the first area of the storage medium held in the storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information written in the second area of the storage medium held in the storage medium holding means;

second deciphering means for deciphering the second ciphered information read by the second reading means, by using the second key information stored in the second key storing means, to obtain limit number information indicating the maximum allowable number of repetitions;

repetition number counting means for obtaining a number of repetitions of the operation of reading the first ciphered information;

repetition number over determining means for determining whether or not the number of repetitions obtained by the repetition number over determining means has reached the maximum allowable number of repetitions obtained by the second deciphering means;

stop means for stopping the operation of reading the first ciphered information when the number of repetitions obtained by the repetition number over determining means has reached the maximum allowable number of repetitions obtained by the second deciphering means; and limit number information renewing means for renewing the second ciphered information in the second area of the storage medium.

17. A user apparatus according to claim 16, wherein said limit number information renewing means further comprises:

remaining number determining means for determining as a remaining number a difference between the maximum allowable number of repetitions obtained by the second deciphering means and the counted number of repetitions obtained by the repetition number counting means;

ciphering means for ciphering information on the remaining number, by using the second key information stored in the second key storing means, to generate a renewal data of the second ciphered information; and writing means for writing the renewal data of the second ciphered information in the second area of the storage medium held in the storage medium holding means.

18. A distributor apparatus comprising:

storage medium holding means for temporarily holding a storage medium containing first and second areas for storing first and second ciphered information, respectively, said second ciphered information indicating a time limit for an operation of reading the first ciphered information by a user apparatus;

time limit information generating means for generating time limit information indicating the time limit;

key storing means for storing key information;

ciphering means for ciphering the time limit information, by using the key information stored in the key storing means, to generate the second ciphered information;

writing means for writing the second ciphered information in the second area of the storage medium held in the storage medium holding means;

reading means for reading the time limit information renewed by a user apparatus from the storage medium when the storage medium is returned from the user apparatus; and amount-of-use detecting means for detecting an amount of the operation of reading the first ciphered information performed in the user apparatus, based upon the renewed time limit information read-out from the storage medium returned from the user apparatus.

19. A user apparatus comprising:

storage medium holding means for temporarily holding a storage medium containing first and second areas for storing first and second ciphered information, respectively, said second ciphered information indicating a time limit for an operation of reading the first ciphered information;

first reading means for reading the first ciphered information written in the first area of the storage medium held in the storage medium holding means;

first key storing means for storing first key information;

second key storing means for storing second key information;

first deciphering means for deciphering the first ciphered information read by the first reading means, to obtain first information to be distributed, by using the first key information stored in the first key storing means;

second reading means for reading the second ciphered information written in the second area of the storage medium held in the storage medium holding means;

second deciphering means for deciphering the second ciphered information read by the second reading means, by using the second key information stored in the second key storing means, to obtain time limit information indicating the time limit;

time counting means for obtaining a time elapsed from a timing at which the time limit information is obtained;

time-over determining means for determining whether the time elapsed from a time at which the time limit information is obtained, has reached the time limit obtained by the second deciphering means;

stop means for stopping the operation of reading the first ciphered information if the time-over determining means determines that time elapsed from the timing at which the time limit information is obtained has reached the time limit obtained by the second deciphering means; and time limit information renewing means for renewing the second ciphered information in the second area of the storage medium.

20. A user apparatus according to claim 19, wherein said time limit information renewing means further comprises:

remaining time determining means for determining as a remaining time a difference between the time limit obtained by the second deciphering means and the time elapsed from a timing at which the time limit information is obtained by the time counting means;

ciphering means for ciphering information on the remaining time, by using the second key information stored in the second key storing means, to generate a renewal data of the second ciphered information; and writing means for writing the renewal data of the second ciphered information in the second area of the storage medium held in the storage medium holding means.

21. A user apparatus comprising:

piece of storage medium holding means for temporarily holding a piece of storage medium which contains first and second areas for storing first and second ciphered information, respectively, said second ciphered information indicating a limit of an operation of reading the first ciphered information;

first reading means for reading the first information written in the first area of the piece of storage medium held in the piece of storage medium holding means;

first deciphering means for deciphering the first ciphered information read by the first reading means, to obtain first information to be distributed;

second reading means for reading the second ciphered information written in the second area of the piece of storage medium held in the piece of storage medium holding means;

second deciphering means for deciphering the second ciphered information read by the second reading means, to obtain limit information indicating the limit of the operation of reading the first ciphered information;

amount-of-use obtaining means for obtaining an amount of the operation of reading the first ciphered information performed in the user apparatus;

over-limit determining means for determining whether the amount of the operation obtained by the amount-of-use obtaining means has reached the limit indicated by the limit information obtained by the second deciphering means; and stop means for stopping the operation of reading the first ciphered information when the over-limit determining means determines that the amount of the operation obtained by the amount-of-use obtaining means has reached the limit; and limit information renewing means for renewing the second ciphered information in the second area of the piece of storage medium.

22. A user apparatus according to claim 21, wherein said limit information renewing means further comprises:

remaining amount determining means for determining as a remaining amount a difference between the limit of the operation of reading the first ciphered information indicated by the limit information obtained by the second deciphering means and the amount of the operation by the amount-of-use obtaining means;

ciphering means for ciphering information on the remaining amount, to generate a renewal data of the second ciphered information; and writing means for writing the renewal data of the second ciphered information in the second area of the piece of storage medium held in the piece of storage medium holding means.

23. A user apparatus comprising:

storage medium holding means for temporarily holding a storage medium which contains first and second areas for storing first and second ciphered information, respectively, and said second ciphered information indicates a maximum allowable accumulated time for an operation of reading the first ciphered information;

first reading means for reading the first information written in the first area of the storage medium held in the storage medium holding means;

first deciphering means for deciphering the first ciphered information read by the first reading means, to obtain first information to be distributed;

second reading means for reading the second ciphered information written in the second area of the storage medium held in the storage medium holding means;

second deciphering means for deciphering the second ciphered information read by the second reading means, to obtain time limit information indicating the maximum allowable accumulated time;

time accumulating means for obtaining an accumulated duration by counting and accumulating at least one duration of the operation of reading the first ciphered information by the first reading means;

time-over determining means for determining whether or not the accumulated duration obtained by the time accumulating means has reached the maximum allowable accumulated time obtained by the second deciphering means;

stop means for stopping the operation of reading the first ciphered information when the time-over determining means determines that the accumulated duration obtained by the time accumulating means has reached the maximum allowable accumulated time obtained by the second deciphering means; and time limit information renewing means for renewing the second ciphered information in the second area of the storage medium.

24. A user apparatus according to claim 23, wherein said time limit information renewing means further comprises:

remaining time determining means for determining as a remaining time a difference between the maximum allowable accumulated time obtained by the second deciphering means and the accumulated duration obtained by the time accumulating means;

ciphering means for ciphering information on the remaining time, to generate a renewal data of the second ciphered information; and writing means for writing the renewal data of the second ciphered information in the second area of the storage medium held in the storage medium holding means.

25. A user apparatus comprising:

storage medium holding means for temporarily holding the storage medium which contains first and second areas for storing first and second ciphered information, respectively, and said second ciphered information indicates a maximum allowable number of repetitions of an operation of reading the first ciphered information;

first reading means for reading the first ciphered information written in the first area of the storage medium held in the storage medium holding means;

first deciphering means for deciphering the first ciphered information read by the first reading means, to obtain first information to be distributed;

second reading means for reading the second ciphered information written in the second area of the storage medium held in the storage medium holding means;

second deciphering means for deciphering the second ciphered information read by the second reading means, to obtain limit number information indicating the maximum allowable number of repetitions;

repetition number counting means for obtaining a number of repetitions of the operation of reading the first ciphered information;

repetition number over determining means for determining whether or not the number of repetitions obtained by the repetition number over determining means has reached the maximum allowable number of repetitions obtained by the second deciphering means;

stop means for stopping the operation of reading the first ciphered information when the number of repetitions obtained by the repetition number over determining means has reached the maximum allowable number of repetitions obtained by the second deciphering means; and limit number information renewing means for renewing the second ciphered information in the second area of the storage medium.

26. A user apparatus according to claim 25, wherein said limit number information renewing means further comprises:

remaining number determining means for determining as a remaining number a difference between the maximum allowable number of repetitions obtained by the second deciphering means and the counted number of repetitions obtained by the repetition number counting means;

ciphering means for ciphering information on the remaining number, to generate a renewal data of the second ciphered information; and writing means for writing the renewal data of the second ciphered information in the second area of the storage medium held in the storage medium holding means.

27. A user apparatus comprising:

storage medium holding means for temporarily holding a storage medium containing first and second areas for storing first and second ciphered information, respectively, said second ciphered information indicating a time limit for an operation of reading the first ciphered information;

first reading means for reading the first ciphered information written in the first area of the storage medium held in the storage medium holding means;

first deciphering means for deciphering the first ciphered information read by the first reading means, to obtain first information to be distributed;

second reading means for reading the second ciphered information written in the second area of the storage medium held in the storage medium holding means;

second deciphering means for deciphering the second ciphered information read by the second reading means, to obtain time limit information indicating the time limit;

time counting means for obtaining a time elapsed from a timing at which the time limit information is obtained;

time-over determining means for determining whether the time elapsed from a time at which the time limit information is obtained, has reached the time limit obtained by the second deciphering means;

stop means for stopping the operation of reading the first ciphered information if the time-over determining means determines that time elapsed from the timing at which the time limit information is obtained has reached the time limit obtained by the second deciphering means; and time limit information renewing means for renewing the second ciphered information in the second area of the storage medium.

28. A user apparatus according to claim 27, wherein said time limit information renewing means further comprises:

remaining time determining means for determining as a remaining time a difference between the time limit obtained by the second deciphering means and the time elapsed from a timing at which the time limit information is obtained, obtained by the time counting means;

ciphering means for ciphering information on the remaining time, to generate a renewal data of the second ciphered information; and writing means for writing the renewal data of the second ciphered information in the second area of the storage medium held in the storage medium holding means.

* * * * *

UNITED STATES PATENT AND TRADEMARK OFFICE
CERTIFICATE OF CORRECTION

PATENT NO. : 5,737,413
DATED : Apr. 7, 1998
INVENTOR(S) : AKIYAMA et al.

It is certified that error appears in the above-identified patent and that said Letters Patent is hereby corrected as shown below:

Col. 1, line 12, change "is relates" to --relates--.

Col. 6, line 7, change "an" to --a--.

Col. 15, line 21, change "into in" to --into--.

Col. 16, line 59, change "149" to --1409--.

Col. 19, line 63 (claim 3, line 15), change "means or" to --means for--.

Col. 20, line 34 (claim 4, line 30), change "obtaining" to --obtained--.

Col. 23, line 61 (claim 11, line 4), change "different" to --difference--.

Col. 28, line 30 (claim 21, line 30), delete "and".

Signed and Sealed this

Eighteenth Day of August, 1998

Attest:

BRUCE LEHMAN

Attesting Officer　　Commissioner of Patents and Trademarks